(12) United States Patent
Oka

(10) Patent No.: US 9,047,846 B2
(45) Date of Patent: Jun. 2, 2015

(54) SCREEN SYNTHESISING DEVICE AND SCREEN SYNTHESISING METHOD

(75) Inventor: Toshio Oka, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 280 days.

(21) Appl. No.: 13/702,341

(22) PCT Filed: Jun. 22, 2011

(86) PCT No.: PCT/JP2011/003569
§ 371 (c)(1),
(2), (4) Date: Dec. 6, 2012

(87) PCT Pub. No.: WO2012/004942
PCT Pub. Date: Jan. 12, 2012

(65) Prior Publication Data
US 2013/0100163 A1    Apr. 25, 2013

(30) Foreign Application Priority Data
Jul. 6, 2010   (JP) ................................. 2010-153987

(51) Int. Cl.
G09G 5/377   (2006.01)
H04N 5/262   (2006.01)
H04N 5/265   (2006.01)

(52) U.S. Cl.
CPC ............. *G09G 5/377* (2013.01); *H04N 5/2624* (2013.01); *H04N 5/265* (2013.01)

(58) Field of Classification Search
CPC ....................................................... G09G 5/377
USPC ................................................ 345/629–630
See application file for complete search history.

(56) References Cited

U.S. PATENT DOCUMENTS 6,493,008 B1 * 12/2002 Yui .............................. 715/840
6,597,378 B1 *  7/2003 Shiraishi et al. ............. 715/764
(Continued)

FOREIGN PATENT DOCUMENTS

CN         1501712 A    6/2004
CN       101146166 A    9/2008
(Continued)

OTHER PUBLICATIONS

International Search Report for PCT/JP2011/003569 dated Sep. 13, 2011.
English Translation of Search Report for Chinese Patent Application No. 201180030691.4 dated Feb. 25, 2015.

*Primary Examiner* — Ke Xiao
*Assistant Examiner* — Kim-Thanh T Tran
(74) *Attorney, Agent, or Firm* — Pearne & Gordon LLP

(57) ABSTRACT

Disclosed is a screen synthesizing device which can achieve greater power saving effects when synthesizing a plurality of display screens containing moving images, without affecting the display result. In the disclosed device, a synthesis destination allocation determination unit (105) determines to synthesize the display layer which is the object of determination among the plurality of display layers including a first display layer having the first frame as a synthesis destination candidate and a second display layer having the second frame as a synthesis destination candidate, in either the first frame or the second frame on the basis of layout information which shows the positional relationship between the display layer which is the object of determination and a determination reference region which corresponds to the display layer which is the object of determination, and on the basis of the synthesis processing costs of the first frame and the second frame.

9 Claims, 19 Drawing Sheets

(56) References Cited

U.S. PATENT DOCUMENTS

| | | |
|---|---|---|
| 6,888,577 B2 | 5/2005 | Waki et al. |
| 7,782,487 B2 | 8/2010 | Nakanishi et al. |
| 2002/0075198 A1* | 6/2002 | Asahi et al. .................... 345/1.1 |
| 2002/0171765 A1 | 11/2002 | Waki et al. |
| 2003/0231259 A1 | 12/2003 | Yui et al. |
| 2006/0290817 A1* | 12/2006 | Yui et al. ...................... 348/564 |
| 2007/0171235 A1 | 7/2007 | Fujita et al. |
| 2008/0068670 A1 | 3/2008 | Nakanishi et al. |

FOREIGN PATENT DOCUMENTS

| | | |
|---|---|---|
| JP | 09-180412 A | 7/1997 |
| JP | 2000-305543 A | 11/2000 |
| JP | 2003-298938 A | 10/2003 |
| JP | 2006-301029 A | 11/2006 |
| WO | 01/54400 A1 | 7/2001 |

* cited by examiner

| LAYER NAME | ATTRIBUTE INFORMATION | FORMAT INFORMATION | ENTITY ADDRESS |
|---|---|---|---|
| A | image | ARGB8888 | 0x00080000 |
| B | movie | YUV420 | 0x00100000 |
| C | text | RGB565 | 0x00200000 |
| D | text | RGB565 | 0x00300000 |

FIG.3

| LAYER NAME | LEFTMOST UPPER-END COORDINATES | RIGHTMOST LOWER-END COORDINATES | HIERARCHY INFORMATION |
|---|---|---|---|
| A | (0, 0) | (400, 240) | 2 |
| B | (200, 100) | (800, 500) | 1 |
| C | (400, 550) | (1000, 630) | 3 |
| D | (600, 50) | (1000, 130) | 4 |

FIG.4

| COMPOSITION TARGET BUFFER NAME | COMPOSITION PROCESS COST VALUE |
|---|---|
| FB0 | 300 |
| FB1 | 200 |

FIG.5

| LEFTMOST UPPER-END COORDINATES | RIGHTMOST LOWER-END COORDINATES | LAYER HIERARCHY INFORMATION |
|---|---|---|
| (0, 0) | (200, 240) | 2 |
| (200, 0) | (400, 100) | 3 |

| LAYER NAME | ATTRIBUTE INFORMATION | FORMAT INFORMATION | ENTITY ADDRESS |
|---|---|---|---|
| A0 | image | ARGB8888 | 0x00080000 |
| A1 | image | ARGB8888 | 0x00082000 |
| A2 | image | ARGB8888 | 0x00084000 |
| B | movie | YUV420 | 0x00100000 |
| C | text | RGB565 | 0x00200000 |
| D | text | RGB565 | 0x00300000 |

| LAYER NAME | LEFTMOST UPPER-END COORDINATES | RIGHTMOST LOWER-END COORDINATES | HIERARCHY INFORMATION |
|---|---|---|---|
| A0 | (0, 0) | (200, 240) | 2 |
| A1 | (200, 0) | (400, 100) | 2 |
| A2 | (200, 100) | (400, 240) | 2 |
| B | (200, 100) | (800, 500) | 1 |
| C | (400, 550) | (1000, 630) | 3 |
| D | (600, 50) | (1000, 130) | 4 |

FIG.12

| TYPE OF OBJECT |
|---|
| image |

| LAYER NAME | LEFTMOST UPPER-END COORDINATES | RIGHTMOST LOWER-END COORDINATES | HIERARCHY INFORMATION | TIMESTAMP INFORMATION |
|---|---|---|---|---|
| A0 | (0, 0) | (200, 240) | 2 | 0 |
| A1 | (200, 0) | (400, 100) | 2 | 0 |
| A2 | (200, 100) | (400, 240) | 2 | 0 |
| B | (200, 100) | (800, 500) | 1 | — |
| C | (400, 550) | (1000, 630) | 3 | — |
| D | (600, 50) | (1000, 130) | 4 | — |

SCREEN SYNTHESISING DEVICE AND SCREEN SYNTHESISING METHOD

TECHNICAL FIELD

The claimed invention relates to a screen compositing apparatus and a screen compositing method in which a plurality of display frames including a moving image are composited.

BACKGROUND ART

In recent years, portable terminal apparatuses have functionally evolved in terms of high-quality video reproduction, large-screen displays and multi-application compatibility, for example. Along with the development of high-function portable terminal apparatuses, it has become important to consider how to perform process for compositing and displaying drawings in a plurality of applications in a power saving manner.

As a conventional technique for compositing screens in which a plurality of display frames (i.e., display layers) including a moving image are composited, a technique disclosed in Patent Literature (PTL) 1 is known. The technique of PTL1 produces a video frame, background frame, and a foreground frame separately. In the technique disclosed in PTL 1, an on-screen image is produced by sequentially superimposing the background frame, the video frame, and the foreground frame in a predetermined order. The "video frame" is configured with display layers for displaying a video image (i.e., moving image). The "background frame" is configured with display layers for displaying a background image (i.e., still image) positioned at the back (lower-layer side) of the video frame. The foreground frame is configured with display layers for displaying a front image (i.e., still image) positioned at the front (upper-layer side) of the video frame. In other words, the technology in PTL 1 discloses that the display layers positioned at the back frame side with respect to the video frame are pre-composited before compositing the background frame with the video frame. Moreover, the technology in PTL 1 discloses that the display layers positioned at the front frame side with respect to the video frame are pre-composited to produce the foreground frame.

The background frames (still image) and the foreground frames (still imago) are updated less frequently than the video frame image (moving image). In other words, in the above-described conventional technology, there is no need to update the background frame and the foreground frame simultaneously with an update of the moving image frame. Accordingly, the screen compositing apparatus in the above-described technique may composite the three frames: the background frame, the moving image frame and the foreground frame immediately before final screen output. Thus, the above-described conventional technology enables power saving by reducing a process load when producing an on-screen image.

CITATION LIST

Patent Literature

PTL 1
Japanese Patent Application Laid-Open No. 2006-301029

SUMMARY OF INVENTION

Technical Problem

In the above-described conventional technology, the screen compositing apparatus composites the three frames: the background frame, the moving image frame and the foreground frame immediately before final screen output. At this case, the screen compositing apparatus is necessary to produce the same output results as those produced in a case where forming the final screen by sequentially repeating a composition of display layers from the lowest layer (i.e., back display layer) as with an ordinary screen compositing apparatus. Therefore, when the screen compositing apparatus sets transparency of an image in a pre-composition of the foreground frame (display layers at the front side) and/or the like, it requires that the screen compositing apparatus perform a pre-compositing process while a set value of the transparency (transparency information) is maintained. The process for performing a pre-composition maintaining the set transparency value is more complicated and requires a greater amount of computation than a conventional transparent composition. Furthermore, the screen compositing apparatus maintains transparency information even after pre-composition. Accordingly, the screen compositing apparatus mast use even more memory for pre-compositing the foreground frame.

On the other hand, in the pre-composition of the background frame, the screen compositing apparatus only needs to perform composition for conventional screen display. Therefore, the pre-composition of the background frame can be achieved via a process that needs less computation than that of the foreground frame even when the transparency of an image is set. Furthermore, there is no need for transparency information after the pre-composition of the background frame. Accordingly, the screen compositing apparatus requires utilization of less memory with respect to the background frames than the pre-composition results of the foreground frame.

The above-described comparison in amount of computation for the pre-composition is a comparison made in a case where the same computational resources are assigned for the foreground frame and the background frame. Another screen compositing apparatus is conceivable, the configuration of which needs to have a hardware engine capable of high-speed process provided for computation in composition process for the foreground frame and needs software computation in composition process for the background frame, for example. In such an apparatus, pre-composition process for the foreground frame can be performed in a smaller amount of computation in comparison with pre-composition process for the background frame. In other words, in such an apparatus, pre-composition process for the foreground frame can be performed at a lower process cost in comparison with pre-composition process for the background frame.

Similarly, a configuration is also conceivable in which a memory is arranged for storing the pre-composition results at a more rapid speed than a memory for the background frame with respect to a foreground frame, and/or the like. With respect to memory for storing the pre-composition results, a foreground frame does not necessarily require more memory than the background frame. In other words, the pre-composition of the foreground frame does not necessarily require a higher process cost than the background frame.

In other words, the condition of the process loads in the pre-composition of the foreground frame and the background frame depend on the characteristics of the computational resources and the memory resources and/or the like of the screen compositing apparatus. The above-described process loads include process costs such as the amount of computation and memory capacity.

On the other hand, the screen compositing apparatus in the above-described conventional technology performs the composition process based only on a display layout (e.g., the hierarchical order of display layers). Thus, a problem exists in which the process load (e.g., the above-described process cost) in the pre-composition of the foreground frame and the background frame has not been considered in the above-described conventional technology. Accordingly, there are cases where the power saving effect in the above-described conventional technology may be insufficient.

An object of the claimed invention is to provide a screen compositing apparatus and a screen compositing method capable of obtaining an improved power saving effect without affecting a display result when compositing a plurality of display frames including a moving image.

Solution to Problem

To achieve the above-described object, a screen compositing apparatus according to a first aspect of the claimed invention includes: a first composition section that composites an input display layer into a first frame; a second composition section that composites an input display layer into a second frame; a composition output section that composites the first frame and the second frame to produce a display screen; and a determination section that receives input of a plurality of display layers including a first display layer associated with the first frame used as a composition destination candidate and a second display layer associated with the second frame used as a composition destination candidate and that determines which one of the first frame and the second frame is composited with a determination, target display layer among the plurality of display layers based on layout information indicating a positional relationship between a determination reference region corresponding to the determination target display layer and the determination target display layer, and a composition process cost for each of the first frame and the second frame.

A screen composition method according to a second aspect of the claimed invention includes: compositing an input display layer into a first frame; compositing an input display layer into a second frame; compositing the first frame and the second frame to produce a display screen; and receiving input of a plurality of display layers including a first display layer associated with the first frame used as a composition destination candidate and a second display layer associated with the second frame used as a composition destination candidate and determining which one of the first frame and the second frame is composited with a determination target display layer among the plurality of display layers based on layout information indicating a positional relationship between a determination reference region corresponding to the determination target display layer and the determination target display layer, and a composition process cost of each of the first frame and the second frame.

Advantageous Effects of invention

The claimed invention enables an improved power saving effect to be obtained when compositing a plurality of display frames including a moving image without affecting a display result.

BRIEF DESCRIPTION OF DRAWINGS

FIG. 3 is a diagram showing an example of object information according to Embodiment 1 of the claimed invention;

FIG. 4 is a diagram showing an example of layout information according to Embodiment 1 of the claimed invention;

FIG. 5 is a diagram showing an example of composition process cost information according to Embodiment 1 of the claimed invention;

FIG. 7 is a diagram showing an example of composition destination determination reference region according to Embodiment 1 of the claimed invention;

FIG. 11 is a diagram showing an example of object information after division according to Embodiment 2 of the claimed invention;

FIG. 12 is a diagram showing an example of layout information after division according to Embodiment 2 of the claimed invention;

FIG. 14 is a diagram showing an example of a type of divisible object according to Embodiment 3 of the claimed invention;

FIG. 17 is a diagram showing an example of layout information according to Embodiment 4 of the claimed invention;

DESCRIPTION OF EMBODIMENTS

Various embodiments of the claimed invention will be described in detail with reference to the drawings. The embodiments described below are only examples, and therefore are not considered to be limiting of the configuration of the system and the configuration of functional blocks.

Each of the screen compositing apparatuses described in the embodiments of the claimed invention composites a plurality of display frames (display layers) which include a moving image. In this compositing process, the screen compositing apparatus separately produces a video frame, a background frame and a foreground frame in a display layout of the plurality of display frames that include a moving image. The "video frame" is a moving image frame configured with display layers for displaying a moving image. The "background frame" is a lower-layer frame configured with display layers for displaying a background image positioned at the back of the moving image frame. The "foreground frame" is an upper-layer frame configured with display layers for displaying a front image positioned at the front of the moving image frame. The background image is a graphic positioned in a layer below the moving image. Hereinafter, this image will be referred to as "lower layer GFX." The front image is a graphic positioned in a layer above the moving image. Hereinafter, this image will be referred to as "upper layer GFX."

In other words, each of the screen compositing apparatuses according to the embodiments of the claimed invention pre-composites display frames (e.g., texts and still images) other than moving images by allocating the display frames as upper-layer and lower-layer frames. The screen compositing apparatuses produce a final display screen by sequentially compositing the lower-layer frame, the moving image frame and the upper-layer frame.

Embodiment 1

Figure 1:
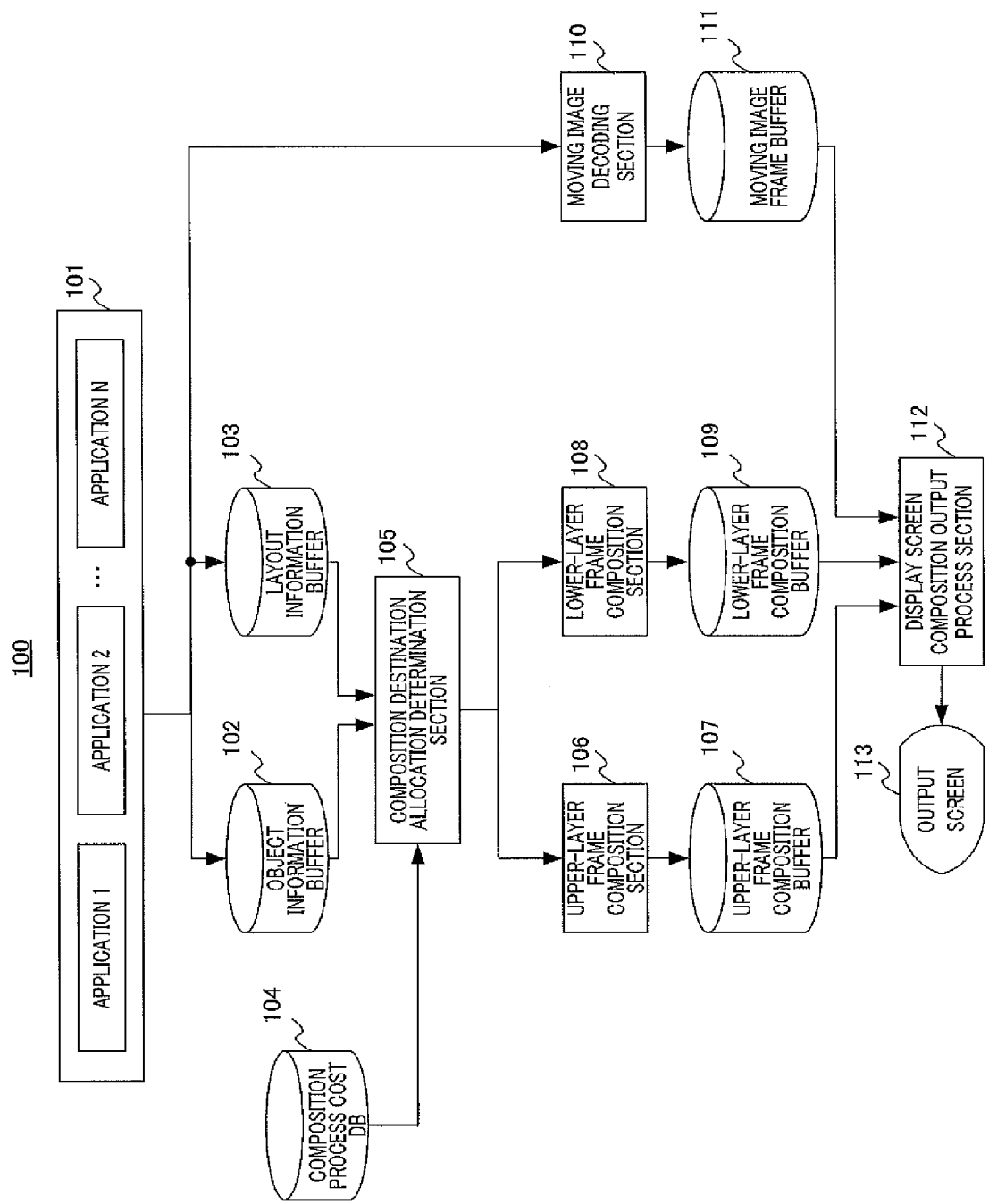
FIG. 1 is a block diagram showing the configuration of a screen compositing apparatus according to Embodiment 1 of the claimed invention.

FIG. 1 is a block diagram showing the configuration of screen compositing, apparatus 100 according to the present embodiment.

In screen compositing apparatus 100 shown in FIG. 1, application group 101 represents a group of applications, such as application 1, application 2, . . . , application N, using screen compositing apparatus 100.

Object information buffer 102 stores object information indicating data of images drawn by the applications in application group 101 and actual data such as texts. The object information is information on objects in display layers, i.e., information indicating the contents of the display layers to be actually displayed in a defined display layout.

Figure 2:
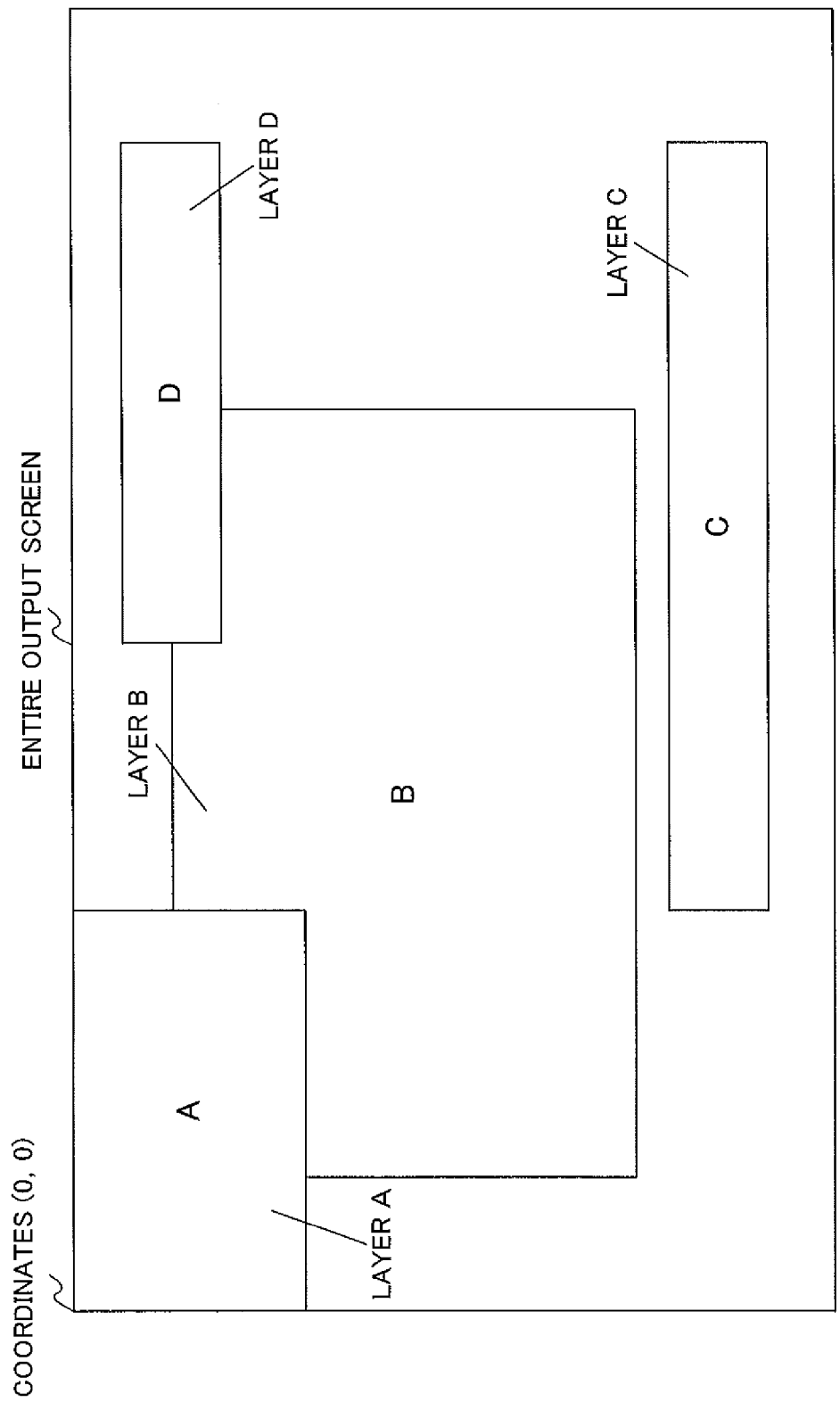
FIG. 2 is a diagram showing an example of a display layout according to Embodiment 1 of the claimed invention.

For example, FIG. 2 shows display layers included in a display layout. In addition, FIG. 3 shows object information about the display layers shown in FIG. 2. In FIG. 2, four display layers: layers A, B, C, and D are displayed with respect to the entire output screen. As shown in FIG. 3, the object information stored in object information buffer 102 is configured of "layer name," "attribute information," "format information" and "storage address." The "layer name" indicates a name of one of the display layers. The "attribute information" indicates an attribute of an object. The "format information" indicates a format of an object. The "storage address" indicates an storage address of an object. In the "attribute information" shown in FIG. 3, a "text" designates a text; an "image" designates a still image; and a "movie" designates a moving image. For example, in FIG. 3, as object information about layer A, attribute information "image" (still image), format information "ARGB8888," and entity address "0x00080000" are shown. The data format of the object information about layers B to D is the same as that of the object information about layer A.

Layout information buffer 103 stores layout information about depiction destination regions for images drawn by the applications in application group 101. Layout information about a depiction destination region is image data coordinate information (information indicating a region in the display layer) and hierarchy information indicating a hierarchical order among the plurality of display layers in the display layout, and/or the like.

For example, FIG. 4 shows layout information regarding the display layers included in the display layout shown in FIG. 2. As shown in FIG. 4, the layout information stored in layout information buffer 103 is configured from "layer name," "leftmost upper-end coordinates," "rightmost lower-end coordinates" and "hierarchy information." A "layer name" indicates the name of one of the display layers. The "leftmost upper-end coordinates" designate the leftmost upper-end coordinate point in the display layer. The "rightmost lower-end coordinates" designate the rightmost lower-end coordinate point in the display layer. The "hierarchy information" indicates a hierarchical order among the plurality of display layers displayed in the entire output screen.

The coordinate expression in FIG. 4 is such that the left upper end of the entire output screen shown in FIG. 2 is expressed as an origin (0, 0) and the coordinate values increase with a change in position in the rightward direction and with a change in position in the downward direction. In the display layout shown in FIG. 2, each display layer is assumed to be a rectangular region expressed by leftmost upper-end coordinates and rightmost lower-end coordinates. A smaller value in the hierarchy information shown in FIG. 4 represents an inner position (lower layer side) on the screen, while a larger value in the hierarchy information represents a front position (i.e., upper layer side) on the screen. In other words, the display layout shown in FIG. 2 represents a hierarchical structure in which layer B (hierarchy information: 1), layer A (hierarchy information: 2), layer C (hierarchy information: 3) and layer D (hierarchy information: 4) are sequentially arranged from the innermost position (i.e., the lower-most layer) on the screen.

Composition process cost DB 104 stores composition process cost information indicating the process cost of each instance of pre-composition process. Hereinafter, the process cost of each instance of the pre-composition process is referred to as the "composition process cost" or "superposition cost". For example, FIG. 5 shows composition process cost information stored in composition process cost DB 104. The composition process cost information shown in FIG. 5 is configured of a "composition target buffer name" indicating the name of the buffer for a composition target and a "composition process cost value" indicating the value of the composition process cost. In composition target buffer names shown in FIG. 5, FB0 indicates upper-layer frame composition buffer 107 and FB1 indicates lower-layer frame composition buffer 109. Each composition process cost value shown in FIG. 5 indicates a computation time required for the composition process in a corresponding one of the buffers. When referring to FIG. 5, the computation time (300) required for the composition process in FB0 (upper-layer frame) is longer than the computation time (200) required for the composition process in FB1 (i.e., lower-layer frame). In other words, when referring to FIG. 5, the composition process cost for the upper-layer frame is higher than that for the lower-layer frame.

The description of the present embodiment has been made by way of example to a case where composition process cost DB 104 retains and uses values determined in advance by a system designer. In the present embodiment, the terminal may measure the process times for the upper-layer frame and the lower-layer frame at the time of screen drawing immediately after power-on in the terminal (e.g., screen compositing apparatus 100), and/or the like. Also, the terminal may register measurement results as composition process costs.

Composition destination allocation determination section 105 selects one of upper-layer frame composition buffer 107 and lower-layer frame composition buffer 109 as a composition destination, for the contents of each of images (i.e., display layers) drawn by the applications in application group 101. More specifically, composition destination allocation determination section 105 refers to object information (e.g., FIG. 3), layout information (e.g., FIG. 4) and composition process cost information (e.g., FIG. 5). The object information is stored in object information buffer 102. The layout information is stored in layout information buffer 103. The composition process cost information is stored in composition process cost DB 104. Composition destination allocation determination section 105 then determines whether to composite the display layer for displaying the contents of each of the images drawn in the applications in the lower frame or in the upper frame. At this time, the display layer for displaying the moving image frame is excluded from the display layers to be allocated to the composition destinations by composition destination allocation determination section 105.

Upper-layer frame composition section 106 composites in upper-layer frame composition buffer 107 the display layer (i.e., the results of drawing of an image by an application that become a composition target) input from composition destination allocation determination section 105. In other words, upper-layer frame composition section 106 composites in upper-layer frame composition buffer 107 the display layer determined to be composited in the upper-layer frame by composition destination allocation determination section 105 (i.e., the display layer determined as upper layer GFX).

Upper-layer frame composition buffer 107 holds the results of the composition of the display layer (i.e., upper layer (GFX) positioned as a layer above the moving image.

Lower-layer frame composition section 108 composites the display layer (i.e., the results of drawing of an image by an application that become a composition target) input from composition destination allocation determination section 105 in lower-layer frame composition buffer 109. In other words, lower-layer frame composition section 108 composites the display layer determined to be composited in the lower-layer frame by composition destination allocation determination section 105 (i.e., the display layer determined as lower layer GFX) in lower-layer frame composition buffer 109.

Lower-layer frame composition buffer 109 holds the results of composition of the display layer (i.e., lower layer GFX) positioned as a layer below the moving image.

In a case where application group 101 includes an application having a moving image reproduction function, moving image decoding section 110 performs decoding process on encoded video data accumulated in screen compositing apparatus 100 or encoded video data transmitted via a network. Moving image decoding section 110 outputs the decoded video data to moving image frame buffer 111.

Moving image frame buffer 111 stores video data input from moving image decoding section 110.

Display screen composition output process section 112 composites data from the back of a display screen in the order described below. The order of the composition from the back of the display screen is the result of the composition of the lower-layer frame held by lower-layer frame composition buffer 109, the video data held by moving image frame buffer 111, and the results of composition of the upper-layer frame held by upper-layer frame composition buffer 107. Accordingly, a final output image (i.e., display screen) is produced. The results of composition of the lower-layer frame are the lower-layer frame formed of display layers pre-composited in layers below the moving image display layer (i.e., moving image layer) (i.e., the background frame). The video data is the moving image layer. The results of the composition of the upper-layer frame are the upper-layer frame formed of display layers pre-composited as layers above the moving image layer (i.e., the foreground frame). Display screen composition output process section 112 outputs the final output image to output screen 113.

Output screen 113 presents the final output image input from display screen composition output process section 112.

Pre-composition process in screen compositing apparatus 100 will be described in detail. Hereinafter, a pre-composition of process will be described with respect to the object information shown in FIG. 3 and the display layout shown in FIG. 2. The display layout shown in FIG. 2 is formed of the layout information shown in FIG. 4.

Figure 6:
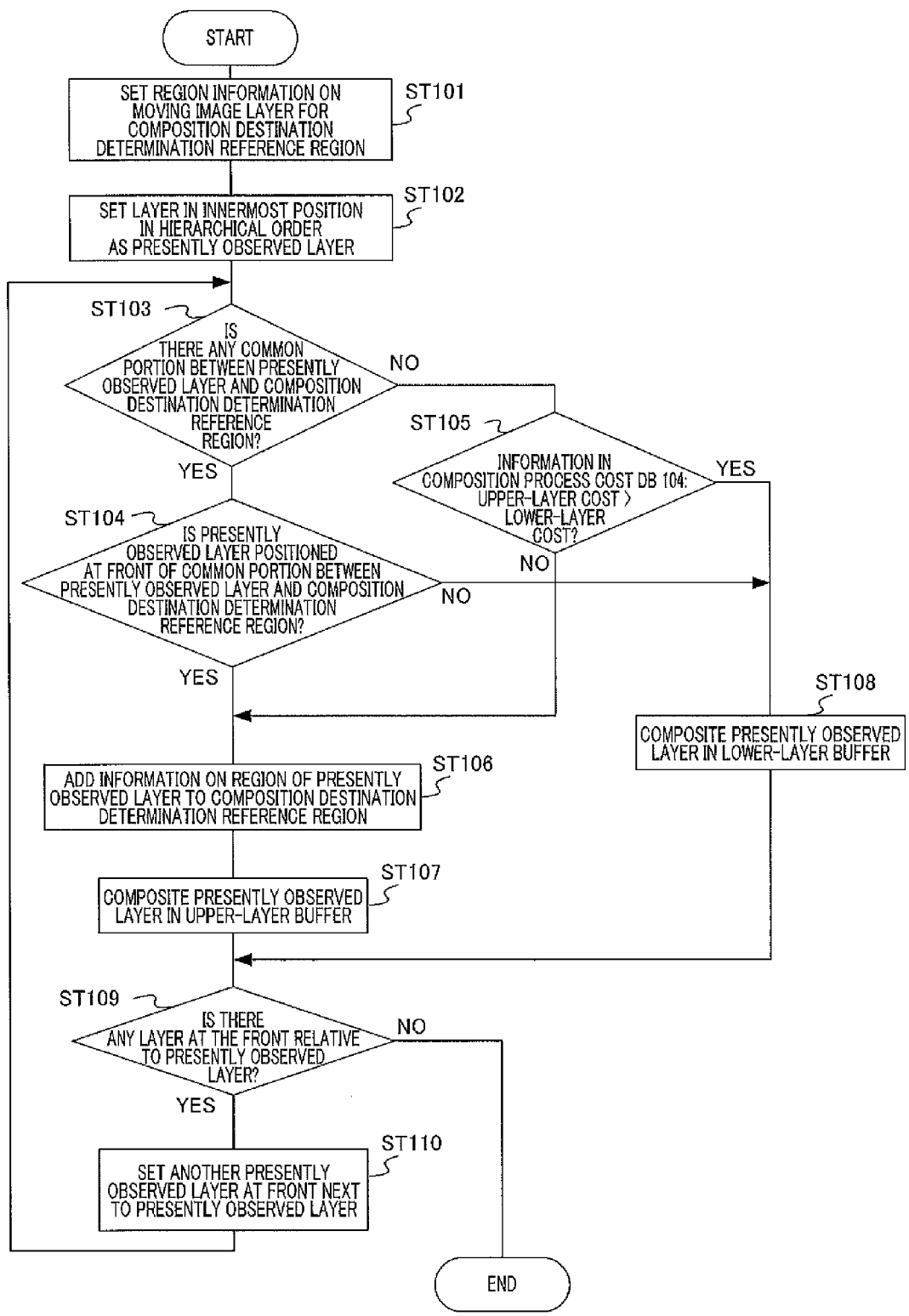
FIG. 6 is a flowchart showing composition destination allocation determination process according to Embodiment 1 of the claimed invention.

FIG. 6 is a flowchart for explaining pre-composition process executed by screen compositing apparatus 100 according to the present embodiment.

In step (hereinafter, referred to as "ST") 101 of FIG. 6, composition destination allocation determination section 105 initializes parameters to be used for determination of allocations of composition destinations. More specifically, composition destination allocation determination section 105 sets information (e.g., coordinates and hierarchy information) on the region of the moving image frame (i.e., the moving image layer, layer B in FIG. 2) as values of a composition destination determination reference region serving as a determination criterion in composition destination allocation determination process.

This composition destination determination reference region corresponds to determination parameters serving as a criterion for determining whether composition destination, allocation determination section 105 allocates the regions to be allocated other than the moving image layer to upper-layer frame composition buffer 107 or lower-layer frame composition buffer 109. For example, the regions to be allocated other than the moving image layer are layers A, C, and D in FIG. 2. Specifically, the composition destination determination reference region is the union of the moving image layer that corresponds to the reference layer, and the display layers to be pre-composited as layers above the moving image layer. The display layers to be pre-composited as layers above the moving image layer are those determined to be composited in upper-layer frame composition buffer 107 in the determination process performed by composition destination allocation determination section 105.

More specifically, the composition destination determination reference region is the union of the reference layer and the display layer to be composited in a composition destination candidate frame based on the hierarchical order among the display layers positioned in hierarchical order between the reference layer and one of the determination target display layers. For example, a composition destination determination reference region for one of the display layers positioned in a determination target layer above the reference layer is the region of the union of the display layer and the reference layer. The display layer is composited in a composition destination candidate frame based on the hierarchical order (i.e., upper-layer frame composition buffer 107) in the display layers between the reference layer and the determination target display layer in the hierarchical order.

FIG. 7 shows an example of a composition destination determination reference region. A composition destination determination reference region is expressed by a set of a plurality of regions. A composition destination determination reference region is expressed by the union of groups of region information in lines each indicating one region. The composition destination determination reference region shown in FIG. 7 is shown as the union of a rectangular region defined by leftmost upper-end coordinates (0, 0), rightmost lower-end coordinates (200, 240) and hierarchy information 2; and another rectangular region defined by leftmost upper-end coordinates (200, 0), rightmost lower-end coordinates (400, 100) and hierarchy information 3. Composition destination allocation determination section 105 determines whether or not the determination target region (i.e., display layer) of composition destination allocation is at the front relative to the composition destination determination reference region (i.e., on the front side or the upper-layer side). Composition destination allocation determination section 105 also determines whether or not the region of the determination target display layer of composition destination allocation has a portion in common with the composition destination determination reference region. Composition destination allocation determination section 105 determines which one of upper-layer frame composition buffer 107 and lower-layer frame composition buffer 109 is composited with the display layer.

In ST101 shown in FIG. 6, composition destination allocation determination section 105 sets the region information about the moving image layer (i.e., layer B shown in FIG. 2) as the composition destination determination reference region to initial values. As a result, the composition destination determination reference region is represented by region information formed of rightmost lower-end coordinates (200, 100), leftmost upper-end coordinates (800, 500) and hierarchy information 1, based on the layout information on layer B shown in FIG. 4.

In ST102, composition destination allocation determination section 105 sets as the present determination target layer of composition destination allocation the display layer in the innermost hierarchical position in the plurality of display layers forming the display layout. Referring to FIG. 2, composition destination allocation determination section 105 sets layer A (corresponding to hierarchy information: 2) in the innermost position in the plurality of display layers (i.e., layers A, C, and D) other than the moving image layer (layer B) as the present determination target layer of composition destination allocation.

In ST103, composition destination allocation determination section 105 determines whether or not a common portion exists in the present determination target layer of composition destination allocation and the composition destination determination reference region.

If a common portion exists in the present determination target layer of composition destination allocation and the composition destination determination reference region (ST103: YES), composition destination allocation determination section 105 performs process in ST104. In ST104, composition destination allocation determination section 105 determines whether or not the present determination target layer of composition destination allocation is positioned at the front of the region existing as the common portion of the present determination target layer for composition destination allocation and the composition destination determination reference region. In other words, composition destination allocation determination section 105 determines whether or not the hierarchy information on the present determination target layer for composition destination allocation is larger than the hierarchy information on the composition destination determination reference region in the common portion.

If the present determination target layer for composition destination allocation is positioned at the front of the region existing as the common portion of the present determination target layer for composition destination allocation and the composition destination determination reference region (ST104: YES), composition destination allocation determination section 105 performs process in ST106. In other words, composition destination allocation determination section 105 determines that the present determination target layer for composition destination allocation is a region that needs to be composited in upper-layer frame composition buffer 107 and proceeds to process in ST106. If the present determination target layer for composition destination allocation is not positioned at the front of the region existing as the common portion of the present determination target layer for composition destination allocation and the composition destination determination reference region (ST104: NO), composition destination allocation determination section 105 performs process in ST108. In other words, composition destination allocation determination section 105 determines that the present determination target layer for composition destination allocation is a region that needs to be composited in lower-layer frame composition buffer 109 and proceeds to process in ST108.

Thus, in a case where a common portion exists in the present determination target layer for composition destination allocation and the composition destination determination reference region (ST103: YES), composition destination allocation determination section 105 performs process in ST104. In other words, composition destination allocation determination section 105 determines in ST104 whether the present determination target layer for composition destination allocation is a layer above or below the composition destination determination reference region. Composition destination allocation determination section 105 then determines, based on the determination result, whether to composite the layer in upper-layer frame composition buffer 107 or in lower-layer frame composition buffer 109.

On the other hand, if no common portion exists in the present determination target layer for composition destination allocation and the composition destination determination reference region (ST103: NO), composition destination allocation determination section 105 performs process in ST105. In ST105, composition destination allocation determination section 105 determines whether or not the composition process cost for the upper-layer frame is higher than the composition process cost for the lower-layer frame by referring to the composition process cost information stored in composition process cost DB 104. The composition process cost for the upper-layer frame is referred to as "upper-layer cost". For example, FB0 shown in FIG. 5 corresponds to the upper-layer cost The composition process cost for the lower-layer frame is referred to as "lower-layer cost". For example, FB1 shown in FIG. 5 corresponds to the lower-layer cost If the upper-layer cost is equal to or lower than the lower-layer cost (ST105: NO), composition destination allocation determination section 105 determines that the cost of composition with the upper-layer frame is lower than the cost of composition with the lower-layer frame. Accordingly, composition destination allocation determination section 105 determines that the present determination target layer for composition destination allocation is a region to be composited in upper-layer frame composition buffer 107 and proceeds to process in ST106. If the upper-layer cost is higher than the lower-layer cost (ST105: YES), composition destination allocation determination section 105 determines that the cost of composition with the lower-layer frame is lower than the cost of composition with the higher-layer frame. Accordingly composition destination allocation determination section 105 determines that the present determination target layer for composition destination allocation is a region to be composited in lower-layer frame composition buffer 109 and proceeds to process in ST108.

Thus, in a case where no common portion exists in the present determination target layer for composition destination allocation and the composition destination determination reference region (ST103: NO), composition destination allocation determination section 105 performs process in ST105. In ST105, composition destination allocation determination section 105 determines, in consideration of display results only, that the present determination target layer for composition destination allocation is a region that can be composited in either of upper-layer frame composition buffer 107 and lower-layer frame composition buffer 109. In other words, composition destination allocation determination section 105 determines to composite the present determination target layer for composition destination allocation in one of upper-layer frame composition buffer 107 and lower-layer frame composition buffer 109 with which composition process can be performed at a lower cost.

If the present determination target layer for composition destination allocation is positioned at the front of the region existing as the common portion of the present determination target layer for composition destination allocation, and the composition destination determination reference region (ST104: YES), composition destination allocation determination section 105 performs process in ST106. Likewise, if the upper-layer cost is equal to or lower than the lower-layer cost (ST105: NO), composition destination, allocation determination section 105 performs process in ST106. In ST106, composition destination allocation determination section 105 performs process for adding to the composition destination determination reference region the region information on the region determined presently to be composited in upper-layer frame composition buffer 107 (i.e., the present determination target layer for composition destination allocation). In other words, composition destination allocation determination section 105 sets the union of the present determination target region (i.e., display layer) for composition destination allocation and the present composition destination determination reference region as a now composition destination determination reference region.

This is because a case is considered in which the present determination target layer for composition destination allocation in composition destination allocation determination process performed after the present composition destination allocation determination process is a region (i.e., display layer) having no portion in common with the present composition destination determination reference region. More specifically, it is intended that composition destination allocation determination section 105 composites this display layer in upper-layer frame composition buffer 107 if this display layer has a portion in common with the present determination target region for composition destination allocation, and if this display layer is positioned at the front relative to the present determination target region for composition destination allocation. In other words, in composition destination allocation determination process performed next time by composition destination allocation determination section 105, composition destination allocation determination section 105 performs composition destination allocation determination process based on composition process cost only on the display layer having no portion in common with the new composition destination determination reference region.

In ST107, upper-layer frame composition section 106 composites the present determination target layer for composition destination allocation in upper-layer frame composition buffer 107.

On the other hand, if the present determination target layer for composition destination allocation is not positioned at the front of the region existing as the common portion of the present determination target layer for composition destination allocation and the composition destination determination reference region (ST104: NO), the process advances to process in ST108. On the other hand, if the upper-layer cost is higher than the lower-layer cost (ST105: YES), the process advances to process in ST108. In ST108, lower-layer frame composition section 108 composites in lower-layer frame composition buffer 109 the present determination target layer for composition destination allocation.

In ST109, composition destination allocation determination section 105 determines whether or not any one of the display layers to be subjected to composition process exists at the front relative to the present determination target layer for composition destination allocation. If one of the display layers to be subjected to composition process exists at the front relative to the present determination target layer of composition destination allocation (ST109: YES), composition destination allocation determination section 105 proceeds to process in ST110. In ST110, composition destination allocation determination section 105 resets the display layer positioned at the front next to the present determination target layer for composition destination allocation, as the next determination target layer for composition destination allocation. Composition destination allocation determination section 105 then returns to ST103 to perform composition destination allocation determination process and composition process on the display layer. On the other hand, if no display layer exists at the front relative to the present determination target layer for composition destination allocation (ST109: NO), composition destination allocation determination section 105 ends the process.

An example of composition destination allocation determination, process and composition process on layer A shown in FIG. 2 will be described. Layer A is a layer higher in position in the hierarchical order relative to layer B (i.e., reference layer). In addition, layer A is a display layer associated with upper-layer frame composition buffer 107 as the composition destination candidate when only the hierarchical order is considered. Also, the composition destination determination reference region corresponding to layer A is the same as layer B.

Referring to FIG. 2, layer A has a portion in common with layer B. Accordingly, composition destination allocation determination section 105 determines that layer A is to be composited in upper-layer frame composition buffer 107, since layer A is positioned as a layer above layer B.

In the following case, composition destination allocation determination section 105 composites the determination target display layer (i.e., layer A) in the composition destination candidate selected from upper-layer frame composition buffer 107 and lower-layer frame composition buffer 109. This case is where the region of the determination target display layer (i.e., layer A) has a portion in common with the composition destination determination reference region including the reference layer. The composition destination candidate for the determination target display layer is upper-layer frame composition buffer 107 when considering only the hierarchical order.

An example of composition destination allocation determination process and composition process on layer. C shown in FIG. 2 will be described. Layer C is a display layer higher in position in the hierarchical order relative to layer B (i.e., reference layer). In addition, layer C is a display layer, whose composition destination candidate is upper-layer frame composition buffer 107 if only the hierarchical order is considered. A composition destination determination reference region associated with layer C is the union of layer B (i.e., reference layer) and layer A (i.e., the layer between layer C and layer B in the hierarchical order, which is to be composited in upper-layer frame composition buffer 107).

Referring to FIG. 2, layer C has no portion in common with be composition destination determination reference region. Accordingly, composition destination allocation determination section 105 determines that layer C is to composited in lower-layer frame composition buffer 109 with which composition process can be performed at a lower cost (see FIG. 5), of upper-layer frame composition buffer 107 and lower-layer frame composition buffer 109.

In other words, in the following case, composition destination allocation determination section 105 composites the determination target display layer (i.e., layer C) in the frame associated with a lower composition process cost among upper-layer frame composition buffer 107 and lower-layer frame composition buffer 109. This case is where the region of the determination target display layer (i.e., layer C) and the composition destination determination reference region including the reference layer have no common portion. The frame that can be composited at a lower composition process cost is lower-layer frame composition buffer 109.

Thus, layer C (hierarchy information: 3) is a display layer to be composited in the upper-layer frame above layer 13 (hierarchy information: 1) if only the hierarchical order is considered. However, layer C is composited in lower-layer frame composition buffer 109 in which composition process can be performed at a lower cost. In other words, in the following case, screen compositing apparatus 100 can select the buffer in which composition process can be performed at a lower cost as a buffer to be composited. This case is where screen compositing apparatus 100 determines that it is not necessarily required to composite the display layer in upper-layer frame composition buffer 107 even display layer C positioned on the surface side (front side) relative to the moving image layer by considering the final display screen.

The description has been made of the display layers (including the above-described layers A and C) higher in position in the hierarchical order than layer B (i.e., reference layer) shown in FIG. 2. However, the object of process is not limited to them. Screen compositing apparatus 100 performs the same process even on any display layer lower in position in the hierarchical order than layer B (i.e., display layer). In other words, screen compositing apparatus 100 also performs the same process as that described above on a display layer (not shown) associated with lower-layer frame composition buffer 109 used as a composition destination candidate when only the hierarchical order is considered.

As described above, screen compositing apparatus 100 determines which one of upper-layer frame composition buffer 107 and lower-layer frame composition buffer 109 is composited with each determination target display layer among a plurality of display layers. Screen compositing apparatus 100 makes this determination based on layout information and the composition process costs in upper-layer frame composition buffer 107 and lower-layer frame composition buffer 109. The layout information indicates the positional relationship between the determination target display layers and determination reference regions associated with the determination target display layers. In this way, screen compositing apparatus 100 can reduce the load of composition process therein without affecting the final display screen. In other words, screen compositing apparatus 100 can reduce the load of composition process therein without changing the hierarchical order in the display layout.

The present embodiment has been described with respect to a case where composition destination allocation determination section 105 makes composition destination determination for each layer when pre-composition process for updating the contents of upper-layer frame composition buffer 107 and lower-layer frame composition buffer 109 is performed. According to the present embodiment, an implementation of the claimed invention is conceivable in which composition destination allocation determination section 105 performs only composition destination determination for each layer in advance at a point in time when a need arises for updating of the results of composition destination determination for the layer. The point in time when a need arises for updating of the results of composition destination determination for each layer is a point in time when the layout information on the layer is changed, for example.

As a result, the screen compositing apparatus according to the present embodiment can obtain an improved power saving effect without affecting display results at the time of compositing a plurality of display frames including a moving image.

Embodiment 2

Figure 8:
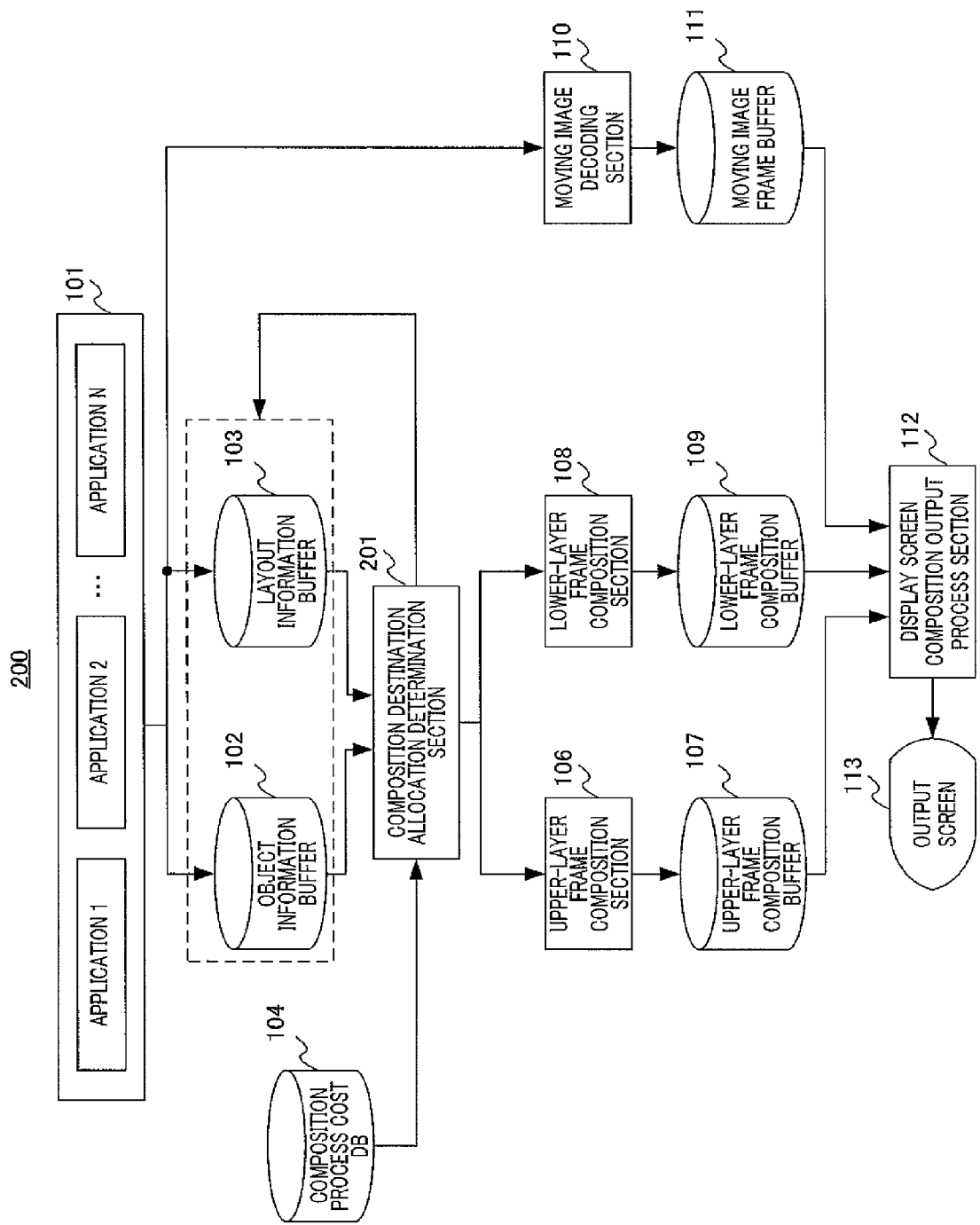
FIG. 8 is a block diagram showing the configuration of a screen compositing apparatus according to Embodiment 2 of the claimed invention.

FIG. 8 is a block diagram showing the configuration of screen compositing apparatus 200 according to the present embodiment. In FIG. 8, the same reference numerals are used for the same components as those in Embodiment 1 (FIG. 1). The description for the same components will not be repeated.

In screen compositing apparatus 200 shown in FIG. 8, composition destination allocation determination section 201 selects a composition destination for the contents of each of images (i.e., display layers) drawn by the applications in application group 101, as does composition destination allocation determination section 105 in Embodiment 1. For example, composition destination allocation determination section 201 shown in FIG. 8 selects one of upper-layer frame composition buffer 107 and lower-layer frame composition buffer 109 as a composition destination for the display layer. At this time, composition destination allocation determination section 201 furthermore determines whether or not the determination target display layer of composition destination allocation can be divided. Composition destination allocation determination section 201 divides the display layer determined to be divisible. Based on the results of this division, composition destination allocation determination section 201 registers changed object information in object information buffer 102 and registers changed layout information in layout information buffer 103.

Pre-composition process in screen compositing apparatus 200 will be described in detail. Description will be made below of pre-composition process with respect to the object information shown in FIG. 3 and the display layout shown in FIG. 2, as is the description of Embodiment 1. The display layout shown in FIG. 2 is formed of the layout information shown in FIG. 4.

Figure 9:
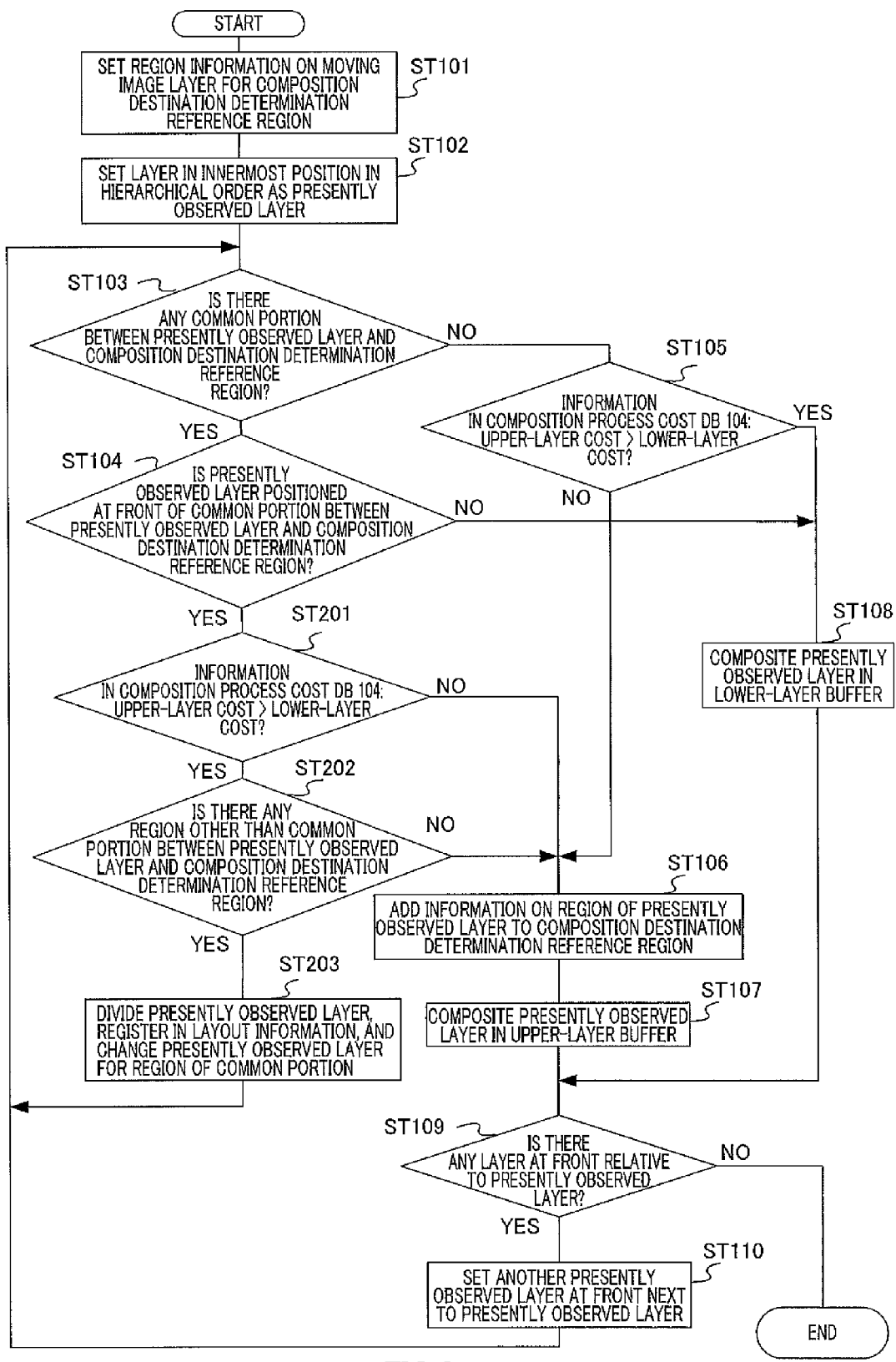
FIG. 9 is a flowchart showing composition destination allocation determination process according to Embodiment 2 of the claimed invention.

FIG. 9 is a flowchart for explaining pre-composition process executed by screen compositing apparatus 200 according to the present embodiment. In FIG. 9, the same reference characters are used for the same process as in Embodiment 1 (FIG. 6). The description for the same process will not be repeated.

When the present determination target layer for composition destination allocation in ST104 shown in FIG. 9 is positioned at the front of the region existing as the common portion of the present determination target layer for composition destination allocation and the composition destination determination reference region (ST104: YES), the process advances to the process in ST201. Composition destination allocation determination section 201 in ST201 determines whether or not the upper-layer cost is higher than the lower-layer cost by referring to the composition process cost information stored in composition process cost DB 104, as it does in ST105. For example, composition destination allocation determination section 201 in ST201 determines whether or not the upper-layer cost (e.g., FB0) is higher than the lower-layer cost (e.g., FB1) by referring to the composition process cost information shown in FIG. 5.

When the upper-layer cost is equal to or lower than the lower-layer cost (ST201: NO), composition destination allocation determination section 201 determines that the composition process cost required for the upper-layer frame is lower than that required for the lower-layer frame. Composition destination allocation determination section 201 determines that the present determination target layer for composition destination allocation is a region to be composited in upper-layer frame composition buffer 107, and proceeds to process in ST106. In other words, the determination made by composition destination allocation determination section 201 when the upper-layer cost is equal to or lower than the lower-layer cost is that the present determination target layer for composition destination allocation is to be composited in upper-layer frame composition buffer 107 regardless of the relationship between the present determination target layer for composition destination allocation and the composition destination determination reference region (i.e., whether or not there is a common portion).

On the other hand, when the upper-layer cost is higher than the lower-layer cost (ST201: YES), composition destination allocation determination section 201 determines in ST202 whether or not the present determination target layer for composition destination allocation and the composition destination determination reference region have a region other than the common portion.

If the present determination target layer for composition destination allocation and the composition destination determination reference region have no region other than the common portion (ST202: NO), the process advances to process in ST106. In other words, composition destination allocation determination section 201 determines that the present determination target layer for composition destination allocation is a region that needs to be composited in upper-layer frame composition buffer 107.

On the other hand, if the present determination target layer for composition destination allocation and the composition destination determination reference region have a region other than the common portion (ST202: YES), the process advances to process in ST203. In ST203, composition destination allocation determination section 201 divides the present determination target layer for composition destination allocation into at least the above-described common portion and the region other than the common portion. In addition, composition destination allocation determination section 201 registers object information and layout information on the display layer after division in object information buffer 102 and layout information buffer 103, respectively. Composition destination allocation determination section 201 resets the region of the above-described common portion in the divided portions of the display layer as the next determination target layer for composition destination allocation. The process then returns to the process in ST103.

A case where the present determination target layer for composition destination, allocation in the display layout shown in FIG. 2 is layer A will be described. In other words, the composition destination determination reference region is the same as layer B shown in FIG. 2 (i.e., rightmost lower-end coordinates (200, 100), leftmost upper-end coordinates (800, 500), and hierarchy information 1).

In this case, composition destination allocation determination section 201 determines that layer A has a portion in common with the composition destination determination reference region (the same region as layer B) (ST103: YES). Composition destination allocation determination section 201 also determines that layer A is positioned at the front (upper layer side) relative to the composition destination determination reference region (sT104; YES). As a result, composition destination allocation determination section 201 determines that at least a portion of layer A or the entire layer A needs to be composited in upper-layer frame composition buffer 107.

Composition destination allocation determination section 201 then compares the upper-layer cost and the lower-layer cost by referring to the composition process cost information (FIG. 5) stored in composition process cost DB 104 (ST201). When the upper-layer cost is higher than the lower-layer cost in FIG. 5 (ST201: YES), the process advances to ST202. In other words, the composition process cost required for the lower-layer frame is lower than that required for the upper-layer frame. Composition destination allocation determination section 201 then determines whether or not layer A and the composition destination determination reference region (i.e., the same region as layer B) have a region other than the common portion (ST202).

As shown in FIG. 2, the region of layer A has a portion in common with layer B and has no portion in common with layer B (i.e., a region other than the common portion). Accordingly, composition destination allocation determination section 201 divides layer A into at least the region of the portion in common with layer B and the region other than the portion in common with layer B (ST203). Since each display layer is expressed as a rectangular region, composition destination allocation determination section 201 divides layer A into layer A2 that corresponds to the portion in common with layer B, and layers A0 and A1 that are regions other than the portion in common with layer B as shown in FIG. 10.

Composition destination allocation determination section 201 registers object information on layer A0 to layer A2 resulting from the division of layer A in object information buffer 102 in place of the object information on layer A, as shown in FIG. 11. Similarly, composition destination allocation determination section 201 registers layout information on layer A0, layer A1 and layer A2 as a result of division of layer A in layout information buffer 103, in place of the layout information on layer A, as shown in FIG. 12.

Composition destination allocation determination section 201 performs composition destination allocation determination process on the display layers indicated by the updated layout information (refer to FIG. 12). More specifically, composition destination allocation determination section 201 first performs composition destination allocation determination process by setting layer A2 shown in FIG. 10 as a present determination target layer for composition destination allocation. Subsequently, composition destination allocation determination section 201 performs composition destination allocation determination process by sequentially setting layers A0 and A1 shown in FIG. 10 as a determination target layer for composition destination allocation.

Figure 10:
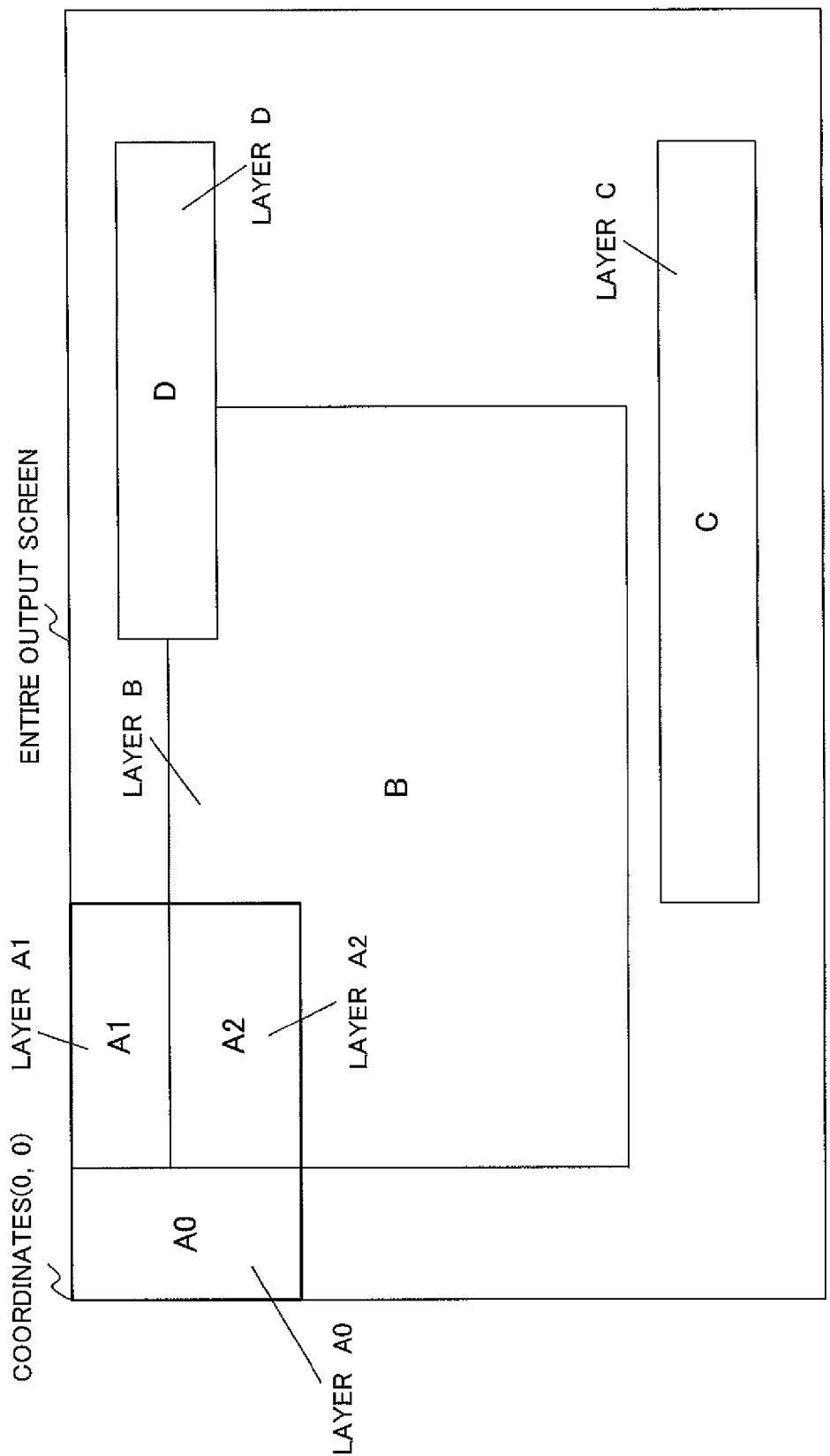
FIG. 10 is a diagram showing an example of a display layout after division according to Embodiment 2 of the claimed invention.

Layer A2 shown in FIG. 10 (the region of the portion in common with the composition destination determination reference region) is thereby determined as a region to be composited in upper-layer frame composition buffer 107. On the other hand, layers A0 and A1 shown in FIG. 10 (the regions other than the portion in common with the composition destination determination reference region) are determined as a region to be composited in lower-layer frame composition buffer 109.

Accordingly, screen compositing apparatus 200 divides the display layer in the case when determining that the entire display layer is to be composited in upper-layer frame composition buffer 107 (ST103: YES, ST104: YES), and when the upper-layer cost is higher than the lower-layer cost (ST201: YES). The display layer in this case is divided into a display layer that needs to be composited in upper-layer frame composition buffer 107 and a display layer that does not affect the final display contents even if it is composited in lower-layer frame composition buffer 109. The display layer that needs to be composited in upper-layer frame composition buffer 107 is the region of the portion in common with the composition destination determination reference region, for example. The display layer that does not affect the final display contents even if it is composited in lower-layer frame composition buffer 109 is a region other than the portion in common with the composition destination determination reference region, for example.

In other words, screen compositing apparatus 200 determines which one of upper-layer frame composition buffer 107 and lower-layer frame composition buffer 109 is composited with the region of the portion in common with the composition destination determination reference region. Screen compositing apparatus 200 makes this determination based on whether the region is a layer above or below the moving image layer (i.e., reference layer) in the hierarchical order. On the other hand, screen compositing apparatus 200 determines that the region other than the portion in common with the composition destination determination reference region is to be composited in a frame associated with a lower composition process cost among upper-layer frame composition buffer 107 and lower-layer frame composition buffer 109.

In this manner, screen compositing apparatus 200 can reduce the region for which the composition destination buffer is to be determined according to the hierarchical order to a minimum (i.e., only the composition buffer for the region of the portion in common with the composition destination determination reference region is determined). In other words, screen compositing apparatus 200 can increase the region that allows the composition destination buffer to be determined according to the composition process cost to a maximum (i.e., the composition buffer for the region other than the region of the portion in common with the composition destination determination reference region is determined). For the region other than the region restricted by hierarchical order among the display layers in the display layout, screen compositing apparatus 200 can perform composition destination allocation determination process by considering the composition process cost. Screen compositing apparatus 200 can minimize the composition process cost in this way.

Thus, according to the present embodiment, the screen compositing apparatus can have a power saving effect without affecting display results when compositing a plurality of display frames including a moving image, which is even greater than that of Embodiment 1.

Embodiment 3

Figure 13:
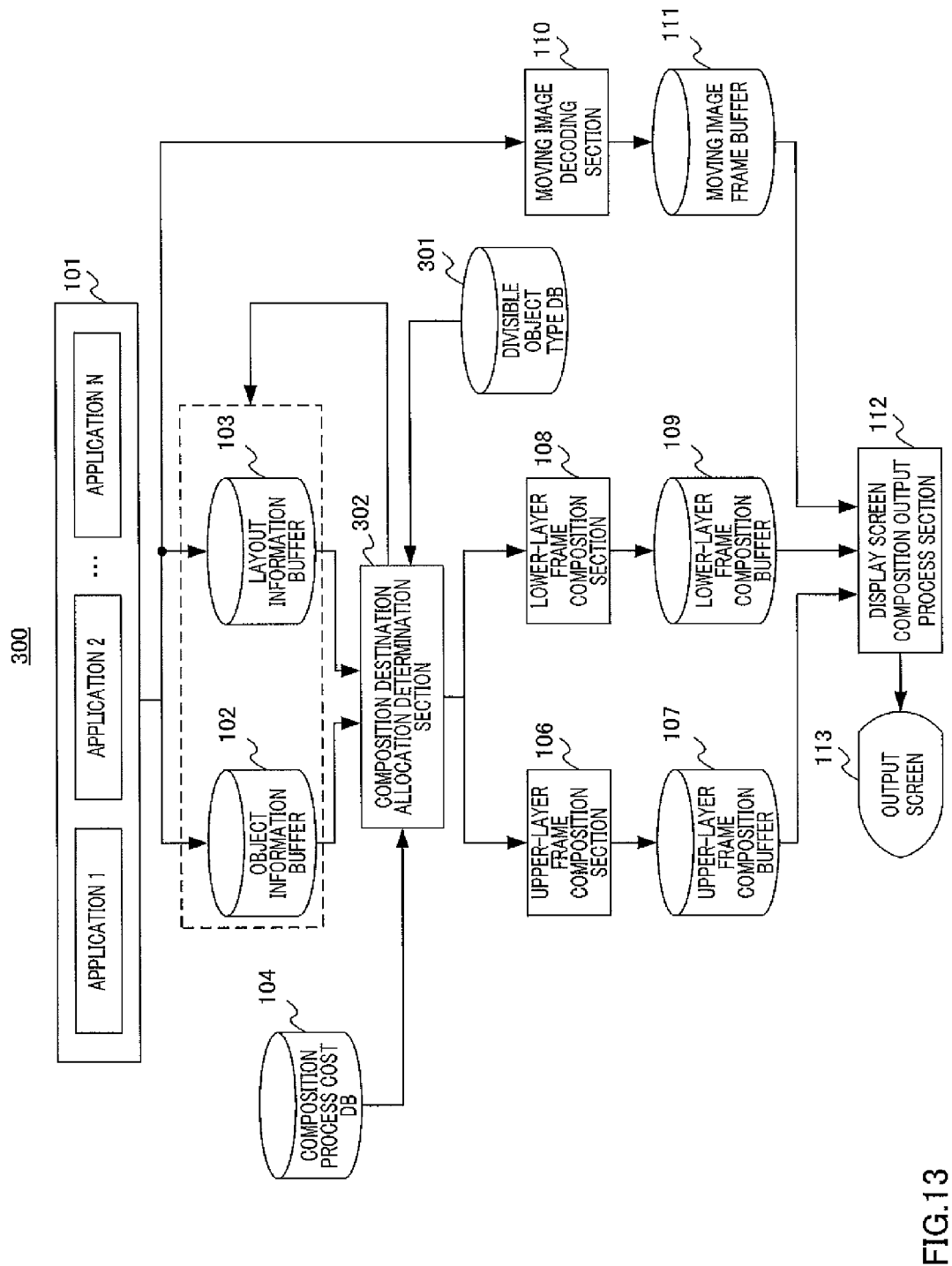
FIG. 13 is a block diagram showing the configuration of a screen compositing apparatus according to Embodiment 3 of the present embodiment.

FIG. 13 is a block, diagram showing the configuration of screen compositing apparatus 300 according to the present embodiment. In FIG. 13, the same reference numerals are used for the same structural elements as those in Embodiment 2 (refer to FIG. 8). Accordingly, descriptions of the same structural elements using the same reference numerals will be omitted.

Figure 14:
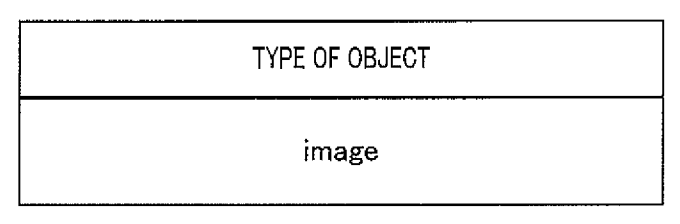

In screen compositing apparatus 300 shown in FIG. 13, divisible object type DB 301 stores information for making determination in composition destination allocation determination process in composition destination allocation determination section 302 as to whether or not a layout division of a display layout can be made. Divisible object type DB 301 stores information indicating the type (i.e., an attribute of a display content in a display layer) of object capable of layout division of a display layout in composition destination allocation determination process. For example. FIG. 14 shows an example of information indicating the type of object capable of layout division of a display layer. In other words, referring to FIG. 14, process for layout division of a display layer can be performed when the object information on the determination target display layer for composition destination allocation is "still image (image)."

Composition destination allocation determination section 302 selects a composition destination for the contents of each of images (display layers) drawn by the applications in application group 101, as does composition destination allocation determination section 201 in Embodiment 2. For example, composition destination allocation determination section 302 shown in FIG. 13 selects one of upper-layer frame composition buffer 107 and lower-layer frame composition buffer 109 as a composition destination for the display layer. In addition, composition destination allocation determination section 302 determines whether or not a layout division of the determination target display layer for composition destination allocation can be made, as does composition destination allocation determination section 201 in Embodiment 2. At this time, composition destination allocation determination section 302 refers to the information stored in divisible object type DB 301 to determine whether or not a layout division of the determination target display layer for composition destination allocation can be made. Composition destination allocation determination section 302 divides the display layer determined to be divisible. Composition destination allocation determination section 302 registers object information that has changed in object information buffer 102 and registers layout information that has changed in layout information buffer 103 according to the division results.

Hereinafter, the pre-composition process in screen compositing apparatus 300 will be described in detail. Similarly to Embodiment 2, the pro-composition process with respect to the object information shown in FIG. 3 and the display layout shown in FIG. 2 will be described in detail. The display layout shown in FIG. 2 is formed of the layout information shown in FIG. 4.

Figure 15:
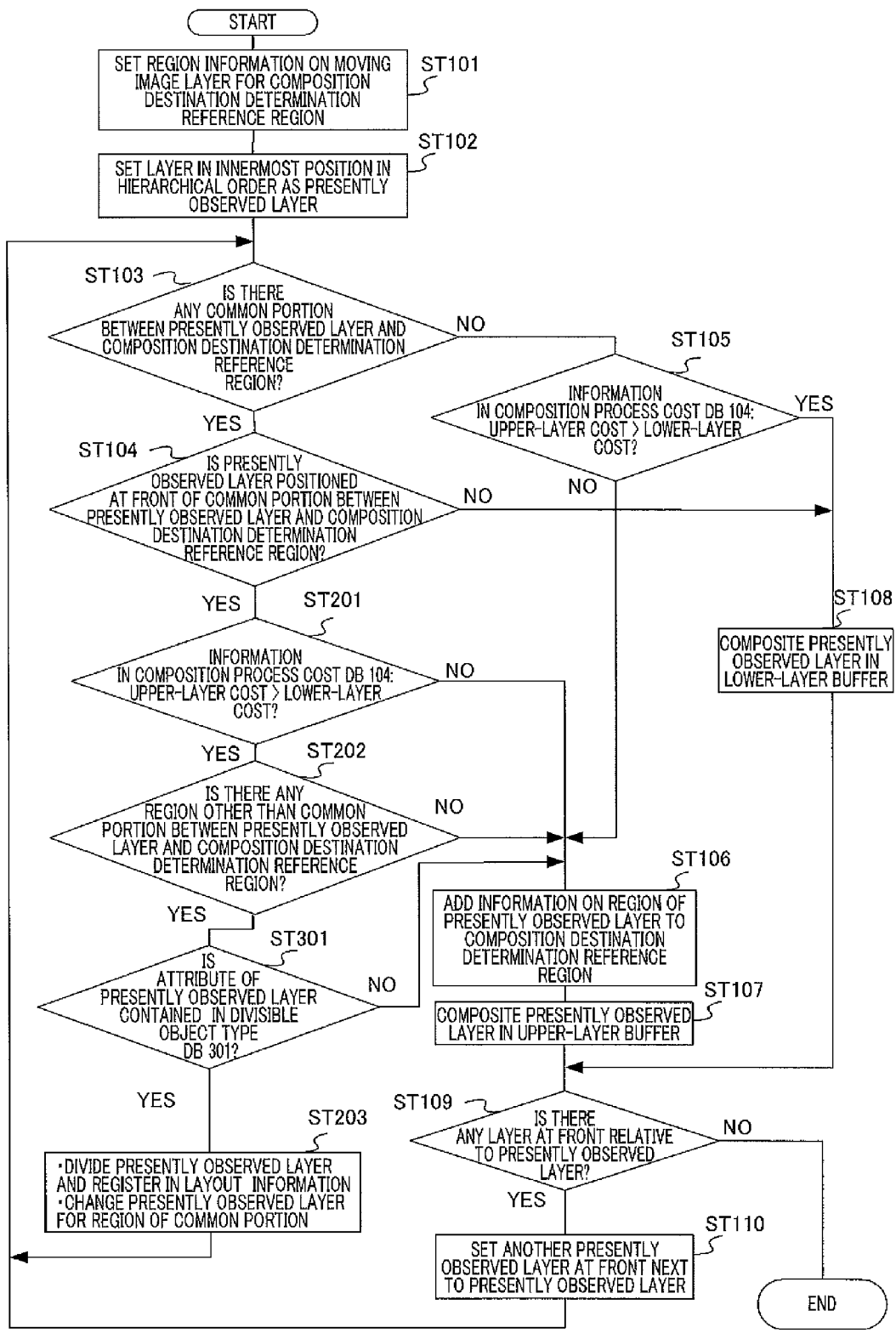
FIG. 15 is a flowchart showing a composition destination allocation determination process according to Embodiment 3 of the claimed invention.

FIG. 15 is a flowchart explaining pre-composition process executed by screen compositing apparatus 300 according to the present embodiment. In FIG. 15, the same reference characters are used for the same process as those in Embodiment 2 (FIG. 9). The description for the same process will not be repeated.

When the present determination target layer for composition destination allocation and the composition destination determination reference region have a region other than the common portion in ST202 shown in FIG. 15 (ST202: YES), the process advances to process in ST301. In ST301, composition destination allocation, determination section 302 determines whether or not an attribute of the present determination target layer for composition destination allocation is included in the object type stored in divisible object type DB 301.

In the following case, composition destination allocation determination section 302 determines that the present determination target layer for composition destination allocation is divisible, and proceeds to process in ST203. This case is where the attribute of the present determination target layer for composition destination allocation is included in the object type stored in divisible object type DB 301 (ST301: YES). In the other case, i.e., in a case where the attribute of the present determination target layer for composition destination allocation is not included in the object type stored in divisible object type DB 301 (ST301: NO), composition destination allocation determination section 302 determines that the present determination target layer for composition destination, allocation is not divisible, and proceeds to process in ST106.

A case where the present determination target layer for composition destination allocation, in the display layout shown in FIG. 2 is layer A will be described. In other words, the composition destination determination reference region is the same as layer B shown in FIG. 2 (i.e., rightmost lower-end coordinates (200, 100), leftmost upper-end coordinates (800, 500), hierarchy information 1).

In this case, composition destination allocation determination section 302 determines that layer A has a portion in common with the composition destination determination reference region (the same region as layer B) (ST103: YES). Composition destination allocation determination section 302 also determines that layer A is positioned at the front (upper layer side) relative to the composition destination determination reference region (ST104: YES). As a result, composition destination allocation determination section 302 determines that at least a portion of layer A or the entire layer A needs to be composited in upper-layer frame composition buffer 107.

Also, by referring to the composition process cost information (see FIG. 5) stored in composition process cost DB 104, composition destination allocation determination section 302 determines that the upper-layer cost is higher than the lower-layer cost (ST201: YES). Composition destination allocation determination section 302 also determines that layer A and the composition destination determination reference region (the same region as layer B) have a region other than the common portion (ST202: YES).

In other words, composition destination allocation determination section 302 requires that part (i.e., the portion in common with the composition destination reference region) of the region of layer A shown in FIG. 2 be composited in upper-layer frame composition buffer 107. On the other hand, composition destination, allocation determination section 302 can composite the other region of layer A (i.e., the region other than the portion in common with the composition destination reference region) in lower-layer frame composition buffer 109. In this manner, screen compositing apparatus 300 can reduce the composition process cost.

Composition destination allocation determination section 302 determines whether or not an attribute of layer A is included in the object type stored in divisible object type DB 301 (ST301). The attribute information on layer A is an "image," as shown in FIG. 3. The type of object stored in divisible object type DB 301 is "image," as shown in FIG. 14. Therefore, composition destination allocation determination section 302 determines that layer A is divisible. Composition destination allocation determination section 302 then makes a layout division of layer A (ST203), as in Embodiment 2 (see FIG. 10). For example, composition destination allocation determination section 302 makes a layout division of layer A such that layer A is divided into the portion in common with the composition destination determination reference region (i.e., layer A2) and the region other than the portion in common with the composition destination determination reference region (i.e., layer A0 and layer A1).

A case where the present determination target layer for composition destination allocation in the display layout shown in FIG. 2 is layer D will be described. In this case, composition destination allocation determination, process with respect to layer A and layer C shown in FIG. 2 is completed. Therefore, the composition destination determination reference region is expressed by the union of layer B and layer A2 (the portion in common with layer A and layer B) shown in FIG. 10.

Composition destination allocation determination section 302 requires that part (the portion in common with the composition destination determination reference range) of the region of layer D shown in FIG. 2 be composited in upper-layer frame composition buffer 107 as it does in the above-described case with respect to layer A. On the other hand, composition destination allocation determination section 302 determines that the other region of layer. D (i.e., the region other than the portion in common with the composition destination determination reference region) can be composited in lower-layer frame composition buffer 109. In this manner, screen compositing apparatus 300 can reduce the composition process cost.

Composition destination allocation determination section 302 determines whether or not an attribute of layer D is stored in divisible object type DB 301 (ST301). The attribute information on layer D is "text," as shown in FIG. 3. The type of object stored in divisible object type DB 301 is an "image," as shown in FIG. 14. Therefore, composition destination allocation determination section 302 determines that layer D is indivisible, and composites layer D in upper-layer frame composition buffer 107 (ST106, ST107).

Thus, screen compositing apparatus 300 determines whether or not the display layer is to be divided, by referring to the attribute of the display contents of the determination target display layer for composition destination allocation, in the following case, screen compositing apparatus 300 performs layout division of the display layer, similar to that of Embodiment 2. This case is where screen compositing apparatus 300 determines that layout division of the display layer is possible. By layout division, the display layer is divided into a display layer that needs to be composited in upper-layer frame composition buffer 107 and a display layer that does not affect the final display contents even when it is composited in lower-layer frame composition buffer 109. The display layer that needs to be composited in upper-layer frame composition buffer 107 is the region of the portion in common with the composition destination determination reference region, and/or the like. Meanwhile, the display layer that does not affect the final display contents even when it is composited in lower-layer frame composition buffer 109 is a region other than the portion in common with the composition destination determination reference region, for example. On the other hand, in a case where screen compositing apparatus 300 determines that layout division of the display layer cannot be performed, screen compositing apparatus 300 composites the entire display layer in the composition destination buffer selected based on the hierarchy information.

Screen compositing apparatus 300 avoids layout division of a display layer in such a format that process for dividing the display contents (i.e., object) accompanying layout division is complicated and/or the like (e.g., objects other than still image ("image") in FIG. 14). In other words, screen compositing apparatus 300 performs layout division of display layers based on the characteristics of screen compositing apparatus 300 and characteristics and/or the like with respect to each object attribute.

Thus, according to the present embodiment, the screen compositing apparatus can have a power saving effect while taking into consideration an object attribute of a display layer and without affecting display results when compositing a plurality of display frames including a moving image, which is even greater than that of Embodiment 1.

The present embodiment has been described with respect to a case where screen compositing apparatus 300 separately executes the determination process in ST103 and the determination process in ST202 shown in FIG. 15. Determination in ST103 is made as to whether or not the present determination target layer for composition destination allocation has a portion in common with the composition destination determination reference region. Determination in ST202 is made as to whether or not the present determination target layer for composition destination allocation and the composition destination determination reference region have a region other than the common portion. However, screen compositing apparatus 300 may perform the determination process in ST103 and the determination process in ST202 at once. Moreover, screen compositing apparatus 300 may be configured so that the result of each of these determination process is referred to at a point in time when the process is required (a point in time corresponding to process in ST103 in FIG. 15 or a point in time corresponding to process in ST202).

The present embodiment has been described with respect to a case where divisible object type DB 301 stores a type of divisible object. However, divisible object type DB 301 may conversely store a type of indivisible object. In other words, composition destination allocation determination section 302 may determine whether or not layout division of the determination target display layer for composition destination allocation can be made based on the type of indivisible object. In addition, the type of divisible object stored in divisible object type DB 301 may be changed during use. The type of divisible object stored in divisible object type may be changed during use, for example, by considering the sum of the sizes of regions that have been subjected to layout division and the sum of the sizes of the regions that have been composited in frames or the sum of composition times.

The screen compositing apparatus in the present embodiment has been described with respect to a case where an attribute of the display contents of the present determination target display layer for composition destination allocation is used as a determination criterion when determining whether or not the display layer is divisible. In the claimed invention, however, an attribute of the display contents of the determination target display layer for composition destination allocation may be used as a criterion for determining a composition destination for the display layer. In other words, the screen compositing apparatus may determine which one of the upper-layer frame composition buffer and the lower-layer frame composition buffer is composited with the display layer thereof based on an attribute of the display contents of the determination target display layer for composition destination allocation. For example, high-speed and/or high-quality process of still image data can be performed at the time of process for composition in the upper-layer frame, depending on the configuration of the screen compositing apparatus. In some cases, however, a function and performance high enough to enable high-speed and/or high-quality process at the time of process for composition in the lower-layer frame are not provided. In such a case, the screen compositing apparatus sets an attribute "still image" of the object to be processed as determination criterion and selects the upper-layer frame as a composition destination for the object, to be processed. Thus, the screen compositing apparatus determines the composition destination buffer for each display layer so that the display layer is composited in a frame in which more appropriate composition process is performed with respect to an attribute of the display contents of the display layer.

Embodiment 4

Figure 16:
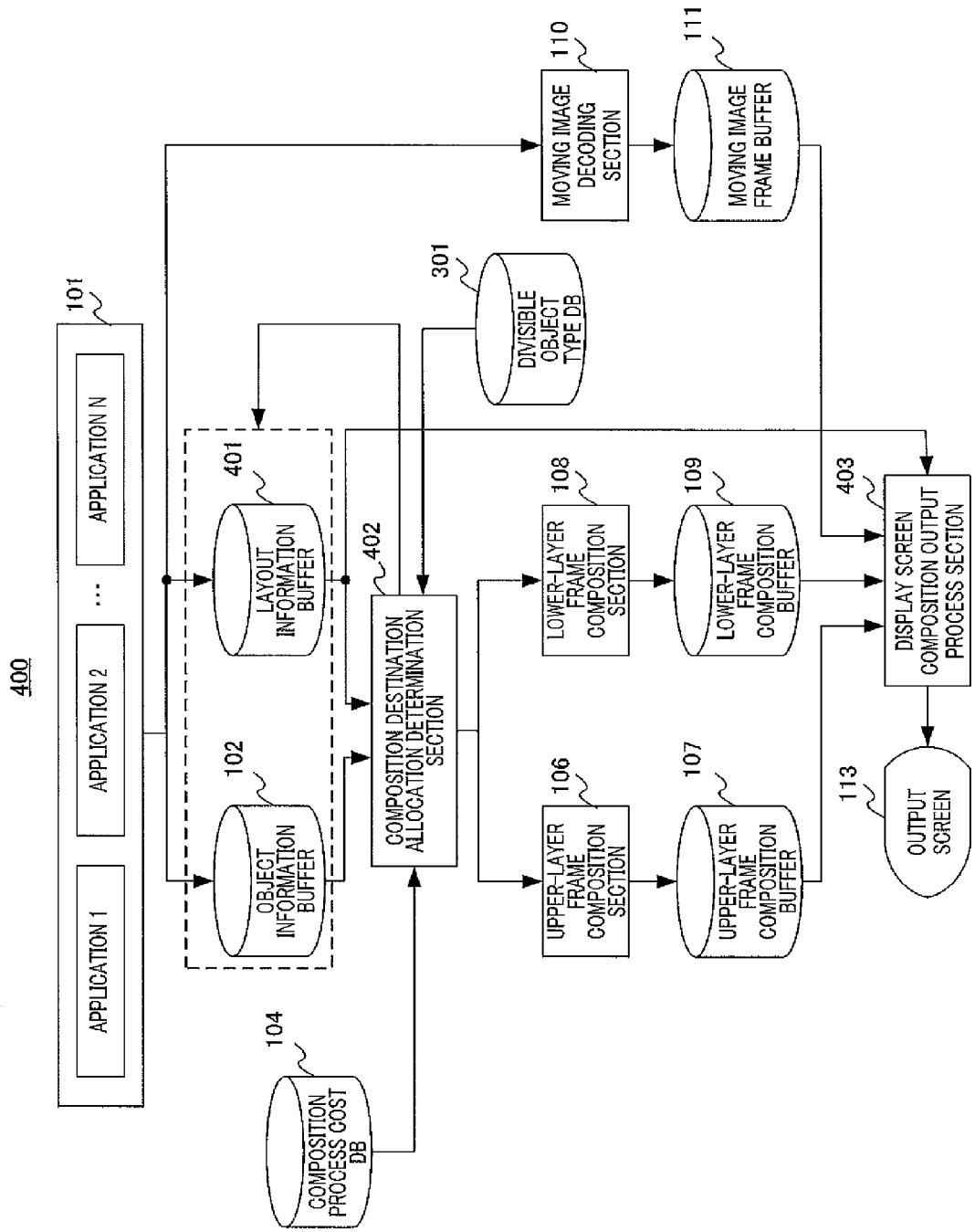
FIG. 16 is a block diagram showing the configuration of a screen compositing apparatus according to Embodiment 4 of the claimed invention.

FIG. 16 is a block diagram showing the configuration of screen compositing apparatus 400 according to the present embodiment, in FIG. 16, the same reference numerals are used for the same components as those in Embodiment 3 (FIG. 13). The description for the same components will not be repeated.

In screen compositing apparatus 400 shown in FIG. 16, layout information buffer 401 stores layout information similar to that in layout information buffer 103 in Embodiments 1 to 3. Layout information similar to that in layout information buffer 103 is image data coordinate information (information indicating the region of each display layer) and hierarchy information, and/or the like. Layout information buffer 401 stores timestamp information as the layout information and the above-described layout information. The timestamp information is information for designating timing (display composition timing) of performing process for display composition of display layers in display screen composition output process section 403 described hereinafter.

For example, as shown in FIG. 17, the layout information stored in layout information buffer 401 is configured of "layer name," "leftmost upper-end coordinates," "rightmost lower-end coordinates," "hierarchy information," and "timestamp information." A value indicated as timestamp information in FIG. 17 ("0" in FIG. 17) denotes a timestamp designating the timing of the display composition of each display layer. A case where there is no need to assign timestamp information is indicated by a symbol (hyphen ("-")) indicating that there is no information.

Composition destination allocation determination section 402 selects a composition destination for the contents of each of images (i.e. display layers) drawn by the applications in application group 101, as does composition destination allocation determination section 302 in Embodiment 3. For example, composition destination allocation determination section 402 shown in FIG. 16 selects one of upper-layer frame composition buffer 107 and lower-layer frame composition buffer 109 as a composition destination for the display layer. Moreover, composition destination allocation determination section 402 determines whether or not a layout division of the determination target display layer for composition destination allocation can be made, by referring to the information stored in divisible object type DB 301, as does composition destination allocation determination section 302 in Embodiment 3.

Composition destination allocation determination section 402 divides the display layer that has been determined as being divisible, as does composition destination allocation determination section 302 in Embodiment 3. Composition destination allocation determination section 402 registers changed object information in object information buffer 102 and registers changed layout information in layout information buffer 103 based on the results of the division. At this time composition destination allocation determination section 402 assigns timestamp information for designating suitable display composition timing to each display layer after division. Composition destination allocation determination section 402 registers the timestamp information as layout information in layout information buffer 401. Composition destination allocation determination section 402 assigns the same time stamp information (i.e., the same display composition timing) to a plurality of display layers as a result of division of a certain display layer.

Display screen composition output process section 403 produces a final output image according to the timestamp information in the layout information stored in layout information buffer 401 when performing composition output process. The final output image is formed by compositing the results of composition of a lower-layer frame held in lower-layer frame composition buffer 109, video data held in moving image frame buffer 111 and the results of composition of an upper-layer frame held in upper-layer frame composition buffer 107. Display screen composition output process section 112 outputs the final output image to output screen 113.

Pre-composition process in screen compositing apparatus 400 will be described in detail. Hereinafter, the pre-composition process will be described with respect to the object information shown in FIG. 3 and the display layout shown in FIG. 2, as is the description of Embodiment 3.

Figure 18:
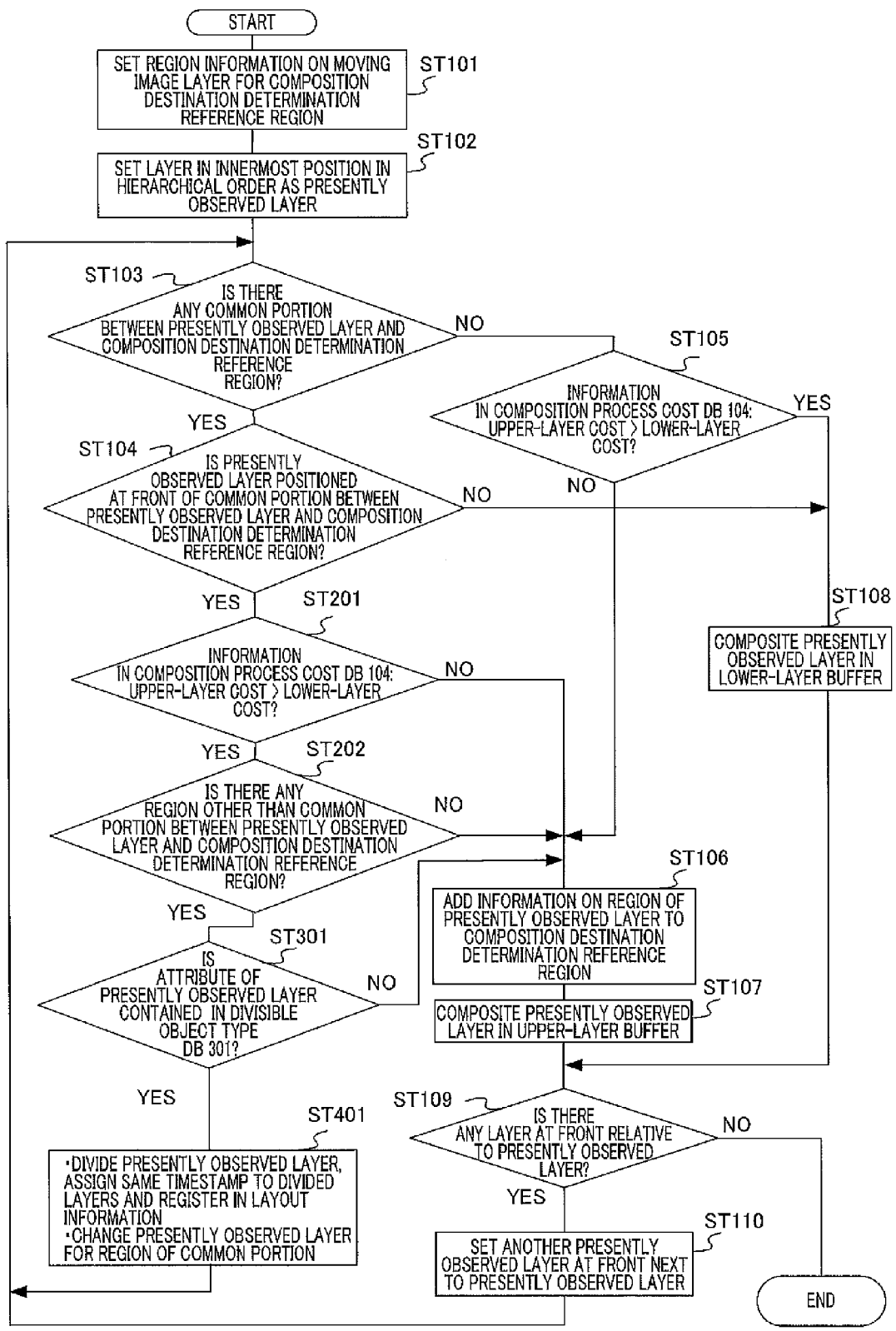
FIG. 18 is a flowchart showing the composition destination allocation determination process according to Embodiment 4 of the claimed invention.

FIG. 18 is a flowchart for explaining the pre-composition process executed by screen compositing apparatus 400 according to the present embodiment. In FIG. 18, the same reference characters are used for the same process as those in Embodiment 3 (FIG. 15). The description for the same process will not be repeated.

When an attribute of the present determination target layer for composition destination allocation is included in the object type stored in divisible object type DB 301 in ST301 shown in FIG. 18 (ST301: YES), the process moves to process in ST401. In ST401, composition destination allocation determination section 302 divides the present determination target layer for composition destination allocation into at least the region of the portion in common with the composition destination determination reference region and the region other than the common portion. Composition destination allocation determination section 402 assigns the same timestamp information to all the display layers after division. Composition, destination allocation determination section 402 registers object information and layout information on the display layers after division in object information buffer 102 and layout information buffer 103, respectively.

As a result, even though the display layer is divided into the plurality of display layers (i.e., regions), the same timestamp is assigned to the plurality of display layers after division. Moreover, composition destination allocation determination section 402 resets the region of the above-described common portion in the divided display layers as the next determination target layer for composition destination allocation. The process then returns to process in ST103.

Figure 19:
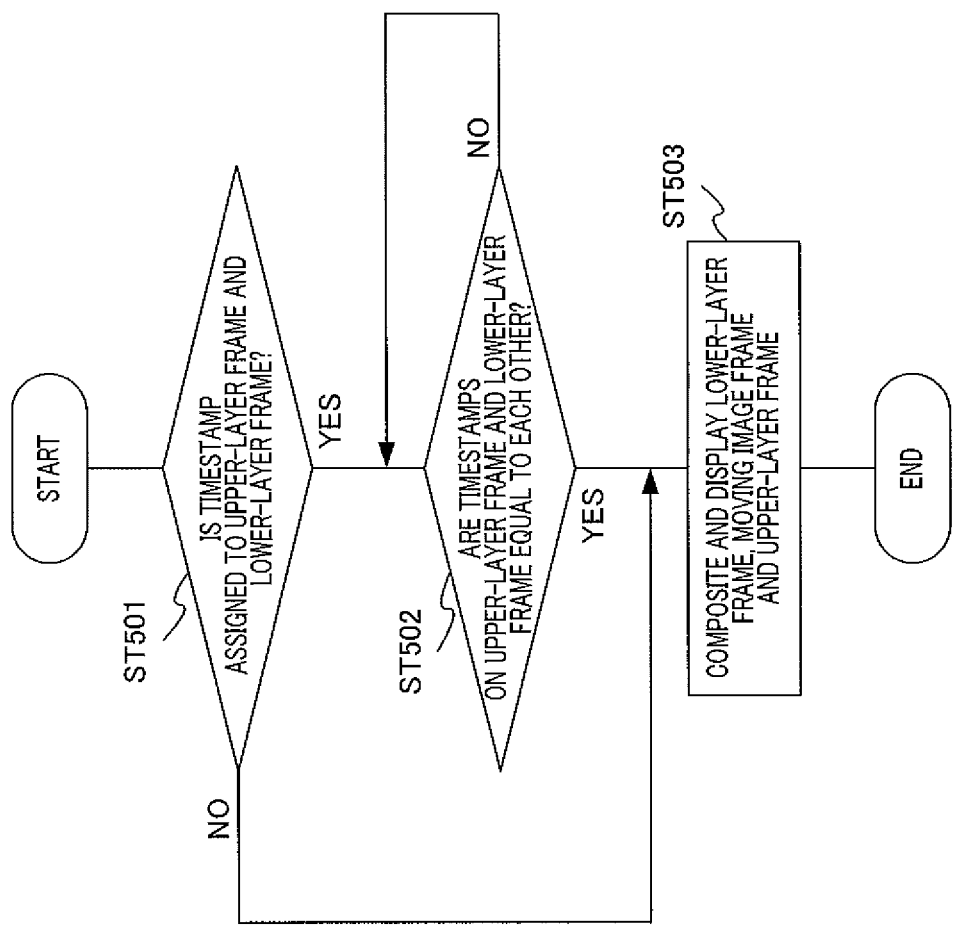
FIG. 19 is a flowchart showing display screen composition output process according to Embodiment 4 of the claimed invention.

Display screen composition output process in display screen composition output process section 403 will be described in detail. FIG. 19 is a flowchart for explaining display screen composition output process executed by display screen composition output process section 403.

Display screen composition output process section 403 in ST501 which is shown in FIG. 19 refers to the layout information stored in layout information buffer 401. Information display screen composition output process section 403 determines whether or not time stamp information is assigned to a display layer composited in upper-layer frame composition buffer 107 and a display layer composited in lower-layer frame composition buffer 109 based on the layer information.

When the time stamp information is assigned to the display layer composited in upper-layer frame composition buffer 107 and the display layer composited in lower-layer frame composition buffer 109 (ST501: YES), the process advances to process in ST502. In ST502, information display screen composition output process section 403 compares the time stamp information assigned to the display layer composited in upper-layer frame composition buffer 107 and the time stamp information assigned to the display layer composited in lower-layer frame composition buffer 109. For example, information display screen composition output process section 403 determines whether or not the two timestamp information items are equal to each other. Information display screen composition output process section 403 continues process in ST502 (i.e., timestamp information comparison process) in a case where the time stamp information assigned to the display layer composited in upper-layer frame composition buffer 107 and the time stamp information assigned to the display layer composited in lower-layer frame composition buffer 109 are not equal to each other (ST502: NO).

On the other hand, when no timestamp information is assigned to the display layer composited in upper-layer frame composition buffer 107 and the display layer composited in lower-layer frame composition buffer 109 (ST501: NO), the process advances to process in ST503. In addition, in a case where the time stamp information assigned to the display layer composited in upper-layer frame composition buffer 107 and the time stamp information assigned to the display layer composited in lower-layer frame composition buffer 109 are equal to each other (ST502: YES), the process advances to process in ST503, in ST503, information display screen composition output process section 403 performs composition process from the hack side of the display screen. In other words, information display screen composition output process section 403 performs composition process in the order of the results of composition in the lower-layer frame, the results of composition of video data, and the results of composition in the upper-layer frame. The results of composition in the lower-layer frame are held in lower-layer frame composition buffer 109. The video data is held in moving image frame buffer 111. The results of composition in the upper-layer frame are held in upper-layer frame composition buffer 107. Output screen 113 displays the final display screen.

In other words, in the following case, information display screen composition output process section 403 determines that the display layers (i.e., data) to be simultaneously displayed are completed in upper-layer frame composition buffer 107 and lower-layer frame composition buffer 109. This case is where the timestamp information items assigned to the display layers respectively composited in the frames are equal to each other (ST502: YES).

A case when the present determination target layer for composition destination allocation in the display layout shown in FIG. 2 is layer A will be described. In other words, the composition destination determination reference region is the same as layer B shown in FIG. 2 (i.e.) rightmost lower-end coordinates (200, 100), leftmost upper-end coordinates (800, 500), hierarchy information 1).

In this case, composition destination allocation determination section 402 determines that layer A is divisible. Composition destination allocation determination section 402 performs a layout division of layer A in the same way as in Embodiment 2 (FIG. 10) (ST401). For example, composition destination allocation determination section 402 performs a layout division of layer A such that layer A is divided into the region of the portion (layer A2) in common with the composition destination determination reference region (layer B) and the region (layer A0, layer A1) other than the portion in common with the composition destination determination reference region At the time of updating the layout information in layout information buffer 401, composition destination allocation determination section 402 assigns the same timestamp information to layers A0, A1, and A2, which are the results of division of layer A. For example, the same timestamp information ("0") is assigned to layers A0, A1, and A2, which are the results of division of layer A.

Layers A0 and A1 (i.e., the region other than the portion in common with the composition destination determination reference region) are composited in lower-layer frame composition buffer 109, as in Embodiment 2. In addition, layer A2 (i.e., the region of the portion in common with the composition destination determination reference region) is composited in upper-layer frame composition buffer 107.

Thus, timestamps are assigned to layer A2 composited in upper-layer frame composition buffer 107 and layer A0 and layer A1 composited in lower-layer frame composition buffer 109 (ST501: YES). When these timestamp information items are equal to each other (ST502: YES), display screen composition output process section 403 performs composition display process so that layers A0, A1, and A2 are displayed at the same timing (ST503).

Accordingly, output screen 113 can display layers A0, A1, and A2, which were originally one display layer (layer A), at the same timing.

Thus, screen compositing apparatus 400 can increase the region (i.e., region other than the portion in common with the composition destination determination reference region) for which the composition destination buffer can be determined based on the composition process cost to a maximum. Screen compositing apparatus 400 can minimize the composition process cost in this way.

Furthermore, screen compositing apparatus 400 assigns the same timestamp information to display layers after division at the time of layout division of a display layer. Screen compositing apparatus 400 performs process for composition display of a final display screen based on the timestamp information. Accordingly, even in the case of dividing a display layer for the purpose of reducing the composition process cost, screen compositing apparatus 400 can control display of divided display layers by correct timing. In other words, screen compositing apparatus 400 can maximize the effect of reducing the composition process cost while maintaining the quality of reproduction of display results.

Thus, according to the present embodiment, the screen compositing apparatus can have a power saving effect without affecting display results when compositing a plurality of display frames including a moving image, which is even greater than that of Embodiment 1.

The present embodiment has been described with respect to a case where screen compositing apparatus 400 performs the following process in a similar way to Embodiment 3: determining whether or not layout division of a determination target display layer for composition destination allocation can be performed, by comparing object attribute information on the display layer and divisible object type DB 301. However, process for determining whether or not layout division can be performed through comparison of object attribute information is not indispensable to screen compositing apparatus 400 according to the present embodiment. For example, screen compositing apparatus 400 according to the present embodiment may perform the same operation as that in Embodiment 2 by omitting this determination process.

The embodiments of the claimed invention have been described above.

The abovementioned embodiments have described a case where the time elapsed during the composition process in each frame is used as an example of a composition process cost value (see FIG. 5). However, the composition process cost value is not limited to the time elapsed during the composition process in each frame. For example, the amount of computation required for process for composition into each frame, the memory access time or the memory access count required for composition process, or a numeric value indicator, and/or the like, computed from these values may alternatively be used as a composition process cost value.

In the screen compositing apparatus according to the claimed invention, selection of the composition target buffer that minimizes the composition process cost relatively is sufficient. Therefore, the composition process cost value may not be a numeric value but information which simply indicates a magnitude relationship in the composition process cost. In the described embodiments, the value of the composition process cost with respect to each buffer itself or the magnitude relationship in the composition process cost value may be changed by considering the sum of the sizes of the display layers (i.e., regions) composited in frames and the sum of composition process times to the present point in time. Moreover, in the described embodiments, a larger value for an indicator used as the composition process cost value that needs to be interpreted as a reduced composition process cost is conceivable, depending on the characteristics of indicator. However, the screen compositing apparatus according to the claimed invention is assumed to be designed so as to suitably operate based on a value used as an indicator.

Furthermore, the embodiments have been described with respect to a case where the cost of the process for composition of the upper-layer frame is higher than the cost of the process for composition of the lower-layer frame (FIG. 5). In the described embodiments, however, the same effects can also be obtained in a case where the cost of the process for composition of the lower-layer frame is higher than the cost of the process for composition of the upper-layer frame. In addition, the screen compositing apparatus in ST102 which is shown in FIG. 6, FIG. 9, FIG. 15 and FIG. 18 may set the display layer at the front position in the hierarchical order (i.e., uppermost layer) as the first determination target layer for composition destination allocation. In such a case, the screen compositing apparatus performs the same process as that in ST106 immediately before ST108 instead of process in ST106 shown in FIG. 6, FIG. 9, FIG. 15 and FIG. 18. This is for the purpose of compositing a display layer in lower-layer frame composition buffer 109 in subsequent composition destination, allocation, determination process in the following case. This case is where even a region (i.e., this display layer) having no portion in common with the present composition destination determination reference region, has a portion in common with the present determination target region for composition destination allocation and is located at an inner position relative to the present determination target region for composition destination allocation. The composition destination determination reference region in this case is a display layer in a hierarchical position between the determination target display layer and the reference layer. In addition, the composition destination determination reference region is the union of a display layer composited in lower-layer frame composition buffer 109 and the reference layer.

Also, the embodiments have been described with respect to a case where a moving image layer is used as a reference layer for the determination as to which one of an upper-layer buffer (i.e., upper-layer frame composition buffer) and a lower-layer buffer (i.e., lower-layer frame composition buffer) is composited with each display layer as a composition destination. In the claimed invention, however, the reference layer used to determine which one of the upper-layer buffer and the lower-layer buffer is composited with each display layer as a composition destination is not limited to the moving image layer. In the described embodiments, a display layer which is most frequently updated among a plurality of display layers in a display layout, e.g., a computer graphic frame in which an image is drawn by computation on each frame, a camera input frame, and/or the like, may be used as a reference layer. In such a case, moving image decoding section 110 shown in FIG. 1, FIG. 8, FIG. 13 and FIG. 16 functions as a functional block fear performing process for drawing an image on a target layer instead of moving image decoding process. In addition, moving image frame buffer 111 in FIG. 1, FIG. 8, FIG. 13 and FIG. 16 functions as a buffer for accumulating the results of drawing of images in a target layer. Furthermore, a special region (moving image layer in the described embodiments) serving as a reference for determining which one of the upper-layer buffer and the lower-layer buffer is composited with each display layer as a composition destination is not limited to a single layer. Such a special region may alternatively be formed of a plurality of display layers.

Each section described in the embodiments is formed typically as art integrated circuit by large scale integration (LSI). Each section may be individually formed as one chip, or one chip may be formed so as to include part or all the sections. While each section is assumed to be an LSI, the LSI may be called an IC, a system LSI, a super LSI or an ultra LSI, depending on the degree of integration therewith as selected from different degrees of integration. The technique for circuit integration is not limited to LSI. A technique using a special-purpose circuit or a general-purpose processor may alternatively be used. In the described embodiments, each section may be formed by using programmable field programmable gate array (FPGA) after making the LSI. In the described embodiments, each section may be formed by using a configurable processor, which is reconfigurable in connections and settings of internal circuit cells of the LSI. Moreover, in the present embodiments, each section may be formed by a circuit integration technique that may replace LSI as a result of progress in semiconductor technology or different technology derived therefrom. In the described embodiments, integration may be performed by using a technique in biotechnology, and/or the like.

The disclosure of Japanese Patent Application No. 2010-153987, filed on Jul. 6, 2010, including the specification, drawings and abstract, is incorporated herein by reference in its entirety.

INDUSTRIAL APPLICABILITY

The claimed invention has improved power saving performance and is useful for display composition process, and/or the like for portable terminals. Moreover, the claimed invention is applicable to use in video apparatuses involving composition of moving images and graphics, e.g., television receivers, and video reproduction apparatuses.

REFERENCE SIGNS LIST 100, 200, 300, 400 Screen compositing apparatus
101 Application group
102 Object information buffer
103, 401 Layout information buffer
104 Composition process cost DB
105, 201, 302, 402 Composition destination allocation determination section
106 Upper-layer frame composition section
107 Upper-layer frame composition buffer
108 Lower-layer frame composition section
109 Lower-layer frame composition buffer
110 Moving image decoding section
111 Moving image frame buffer
112, 403 Display screen composition output process section
113 Output screen
301 Divisible object type DB

The invention claimed is:

1. A screen compositing apparatus comprising:
a first composition section that composites an input display layer into a first frame;
a second composition section that composites an input display layer into a second frame;
a composition output section that composites the first frame and the second frame to produce a display screen; and
a determination section that receives input of a plurality of display layers including a first display layer associated with the first frame used as a composition destination candidate and a second display layer associated with the second frame used as a composition destination candidate and that determines which one of the first frame and the second frame is composited with a determination target display layer among the plurality of display layers based on layout information indicating a positional relationship between a determination reference region corresponding to the determination target display layer and the determination target display layer, and a composition process cost for each of the first frame and the second frame, wherein
the first display layer is higher in position than a reference layer in a hierarchical order, and the second display layer is lower in position than the reference layer in the hierarchical order,
the composition output section composites the first frame formed of at least one of the display layers pre-composited in a higher hierarchical order than the reference layer, the reference layer, and the second frame formed of at least one of the display layers pre-composited in a lower hierarchical order than the reference layer,
when the region of the determination target display layer has a portion in common with the determination reference region including the reference layer, the determination section determines that the determination target display layer is composited in any one of the first frame and the second frame that is the composition destination candidate frame associated with the determination target display layer, and
when the region of the determination target display layer has no portion in common with the determination reference region, the determination section determines that the determination target display layer is composited in any one of the first frame and the second frame that is capable of compositing the determination target display layer at the lowest one of the composition process costs, wherein
if the region of the determination target display layer has a portion in common with the determination reference region, the determination section divides the determination target display layer into at least a first region corresponding to the portion in common with the determination reference region and a second region other than the first region, and
the determination section determines that the first region is composited in any one of the first frame and the second frame that is the composition destination candidate frame associated with the determination target display layer, and the determination section determines that the second region is composited in any one of first frame and the second frame that is capable of compositing the determination target display layer at the lowest one of the composition process costs.

2. The screen compositing apparatus according to claim 1, wherein the composition process cost is a computation time elapsed in the composition process, an amount of computation calculated in the composition process, a memory access time required in the composition process, or a required memory access count in the composition process for each of the first frame and the second frame.

3. The screen compositing apparatus according to claim 1, wherein the determination reference region is a region corresponding to a union of the reference layer, and a display layer composited in a composition destination candidate frame among display layers positioned between the reference layer and the determination target display layer in the hierarchical order.

4. The screen compositing apparatus according to claim 1, wherein
the determination section further assigns the same timestamp to the first region and the second region, and
the composition output section determines timing for compositing the plurality of display layers according to the timestamp.

5. The screen compositing apparatus according to claim 1, wherein the determination section further determines whether or not to divide the determination target display layer, based on an attribute of display contents of the determination target display layer.

6. The screen compositing apparatus according to claim 1, wherein the determination section further determines which one of the first frame and the second frame is composited with the determination target display layer, based on an attribute of display contents of the determination target display layer.

7. The screen compositing apparatus according to claim 1, wherein the reference layer is a display layer updated most frequently among the plurality of display layers.

8. The screen compositing apparatus according to claim 1, wherein the reference layer is a display layer for displaying a moving image.

9. A screen composition method comprising:
compositing an input display layer into a first frame;
compositing an input display layer into a second frame;
compositing the first frame and the second frame to produce a display screen; and
receiving input of a plurality of display layers including a first display layer associated with the first frame used as a composition destination candidate and a second display layer associated with the second frame used as a composition destination candidate and determining which one of the first frame and the second frame is composited with a determination target display layer among the plurality of display layers based on layout information indicating a positional relationship between a determination reference region corresponding to the determination target display layer and the determination target display layer, and a composition process cost of each of the first frame and the second frame, wherein
the first display layer is higher in position than a reference layer in a hierarchical order, and the second display layer is lower in position than the reference layer in the hierarchical order,
the first frame formed of at least one of the display layers pre-composited in a higher hierarchical order than the reference layer, the reference layer, and the second frame formed of at least one of the display layers pre-composited in a lower hierarchical order than the reference layer, are composited;
when the region of the determination target display layer has a portion in common with the determination reference region including the reference layer, it is determined that the determination target display layer is composited in any one of the first frame and the second frame that is the composition destination candidate frame associated with the determination target display layer, and
when the region of the determination target display layer has no portion in common with the determination reference region, it is determined that the determination target display layer is composited in any one of the first frame and the second frame that is capable of compositing the determination target display layer at the lowest one of the composition process costs, wherein
if the region of the determination target display layer has a portion in common with the determination reference region, the determination target display layer is divided into at least a first region corresponding to the portion in common with the determination reference region and a second region other than the first region, and
it is determined that the first region is composited in any one of the first frame and the second frame that is the composition destination candidate frame associated with the determination target display layer, and
it is determined that the second region is composited in any one of first frame and the second frame that is capable of compositing the determination target display layer at the lowest one of the composition process costs.

* * * * *